(12) United States Patent
Ashida et al.

(10) Patent No.: US 8,836,815 B2
(45) Date of Patent: Sep. 16, 2014

(54) IMAGING APPARATUS AND METHOD OF CALCULATING WHITE BALANCE GAIN

(71) Applicant: FUJIFILM Corporation, Tokyo (JP)

(72) Inventors: Tetsuro Ashida, Saitama (JP); Tomoyuki Kawai, Saitama (JP); Seiji Tanaka, Saitama (JP); Hisashi Endo, Saitama (JP); Takehiro Kouguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 13/686,207

(22) Filed: Nov. 27, 2012

(65) Prior Publication Data

US 2013/0088623 A1    Apr. 11, 2013

Related U.S. Application Data

(63) Continuation of application No. PCT/JP2011/061100, filed on May 13, 2011.

(30) Foreign Application Priority Data

May 28, 2010    (JP) ................................. 2010-123585

(51) Int. Cl.
*H04N 9/73*    (2006.01)
*H04N 5/355*    (2011.01)
*H04N 9/04*    (2006.01)
*H04N 5/335*    (2011.01)

(52) U.S. Cl.
CPC ........... *H04N 5/335* (2013.01); *H04N 5/35563* (2013.01); *H04N 9/045* (2013.01); *H04N 9/735* (2013.01)
USPC .......................... 348/223.1; 348/280; 382/167

(58) Field of Classification Search
USPC ......... 348/223.1, 280, 655; 382/167; 358/516
See application file for complete search history.

(56) References Cited

U.S. PATENT DOCUMENTS

| 2003/0058351 A1 | 3/2003 | Maeda |
| 2006/0176379 A1 | 8/2006 | Hyodo |
| 2009/0015689 A1 | 1/2009 | Murayama |

FOREIGN PATENT DOCUMENTS

| JP | 2003102022 A | 4/2003 |
| JP | 2006222672 A | 8/2006 |
| JP | 2009017457 A | 1/2009 |
| JP | 2009268078 A | 11/2009 |

OTHER PUBLICATIONS

International Search Report dated Aug. 9, 2011 issued in International Application No. PCT/JP2011/061100 (PCT/ISA/210).

*Primary Examiner* — Paul Berardesca
(74) *Attorney, Agent, or Firm* — Sughrue Mion, PLLC

(57) ABSTRACT

A WB gain calculation unit 24 determines a light source of a Surface A on the basis of color distribution of the Surface A and a black body locus AD, determines a light source of a Surface B on the basis of color distribution of the Surface B and a black body locus BD and determines a light source of a Surface AB on the basis of color distribution of the Surface AB and a block body locus ABD and calculates the white balance gains on the basis of the determined light sources.

24 Claims, 14 Drawing Sheets

IMAGING APPARATUS AND METHOD OF CALCULATING WHITE BALANCE GAIN

TECHNICAL FIELD

The present invention relates to an imaging apparatus and a method of calculating a white balance gain.

BACKGROUND ART

Up until now, various imaging apparatuses having a solid state imaging device formed with a pair of two photoelectric conversion elements capable of obtaining signals which are different in sensitivity so as to expand a dynamic range (D range) has been proposed (for example, see Patent Document 1).

The imaging apparatus described in Patent Document 1 has a solid state imaging device, in which the solid state imaging device includes: a pair of pixel units of two photoelectric conversion elements which includes red color filters each having different wavelength selectivity and disposed at an upper portion thereof, a pair of pixel units of two photoelectric conversion elements which includes green color filters each having different wavelength selectivity and disposed at an upper portion thereof, and a pair of pixel units of two photoelectric conversion elements which includes blue color filters each having wavelength selectivity and disposed at an upper portion thereof. Further, an improvement in color reproducibility is realized by synthesizing signals obtained from each of the two photoelectric conversion elements of each pair of pixel units. In addition, an expansion of a dynamic range is realized by making the sensitivity between the two photoelectric conversion elements of each pair of the pixel units to be different (changing a structure of the two photoelectric conversion elements or changing exposure time of the two photoelectric conversion elements).

In the case of the solid state imaging device having a configuration described in Patent Document 1, because spectral characteristics of the two photoelectric conversion elements of the pair of pixel units are different, there is a need to devise a method of adjusting the white balance. However, Patent Document 1 does not describe a method of adjusting white balance.

Patent Documents 2 to 4 disclose a technology of adjusting white balance. However, Patent Documents 2 to 4 all disclose a technology of a solid state imaging device having a configuration different from that described in Patent Document 1, which cannot implement both of the improvement in color reproducibility and the improvement in precision of a white balance adjustment.

CITATION LIST

Patent Literature

Patent Document 1: JP-A-2009-268078
Patent Document 2: JP-A-2009-17457
Patent Document 3: JP-A-2003-102022
Patent Document 4: JP-A-2006-222672

SUMMARY OF INVENTION

Technical Problem

The present invention has been made in an effort to solve the problems described above and an object of the present invention is to provide an imaging apparatus and a method of calculating a white balance gain capable of appropriately adjusting white balance while improving color reproducibility.

Solution to Problem

The imaging apparatus of the present invention is formed with a solid state imaging device including plural pairs of first and second photoelectric conversion elements which are different from each other in spectral sensitivity characteristics. The wavelength range in which the first photoelectric conversion element of each pair mainly has a spectral sensitivity and the wavelength range in which the second photoelectric conversion element of each pair mainly has a spectral sensitivity fall within a wavelength range of a specific color of a visible light, respectively. The plural pairs includes plural kinds of pairs of which the specific colors are different from each other. The imaging apparatus has a first mode in which an added signal obtained by adding signals obtained from the first and second photoelectric conversion elements of the pair and corresponded to the pair is processed to generate an image data and a second mode in which signals obtained from the plurality of first photoelectric conversion elements and the plurality of second photoelectric conversion elements are processed to generate an image data. The imaging apparatus includes: a memory unit that stores black body locus data indicating a locus of a color change of an object by a color temperature in a predetermined color space as black body locus data for a first signal obtained from a first group formed with the plurality of first photoelectric conversion elements and black body locus data for a second signal obtained from a second group formed with the plurality of second photoelectric conversion elements, respectively; a color information generating unit that divides the first signal into a plurality of blocks to generate first color information of each block from the first signal of each block, divides the second signal into the plurality of blocks to generate second color information of each block from the second signal of each block, and divides the added signal into the plurality of blocks to generate third color information of each block from the signal of each block; a black body locus data acquiring unit that acquires black body locus data for the added signal; a light source information determining unit that performs a first processing of independently determining first light source information on the first signal at the time of imaging and second light source information on the second signal at the time of the imaging based on distribution of the first color information, the black body locus data for the first signal, distribution of the second color information, and the black body locus data for the second signal during the second mode, and performs a second processing of determining third light source information on the added signal at the time of the imaging based on distribution of the third color information and the black body locus data for the added signal during the first mode; a white balance gain calculating unit that calculates white balance gains of the first signal and the second signal based on the first light source information and the second light source information and calculates a white balance gain of the added signal based on the third light source information.

The method of the present invention calculates a white balance gain in an imaging apparatus formed with a solid state imaging device including plural pairs of first and second photoelectric conversion elements which are different from each other in spectral sensitivity characteristics. The wavelength range in which the first photoelectric conversion element of each pair mainly has a spectral sensitivity and the wavelength range in which the second photoelectric conversion element of each pair of mainly has a spectral sensitivity fall within a wavelength range of a specific color of a visible light, respectively, wherein the plural pairs includes plural kinds of pairs of which the specific colors are different from each other. The imaging apparatus has a first mode in which an added signal obtained by adding signals obtained from the first and second photoelectric conversion elements of the pair and corresponded to the pair is processed to generate an image data and a second mode in which signals obtained from the plurality of first photoelectric conversion elements and the plurality of second photoelectric conversion elements are processed to generate an image data. The imaging apparatus includes a memory unit that stores black body locus data indicating a locus of a color change of an object by a color temperature in a predetermined color space as black body locus data for a first signal obtained from a first group formed with the plurality of first photoelectric conversion elements and black body locus data for a second signal obtained from a second group formed with the plurality of second photoelectric conversion elements, respectively. The method includes: a color information generating step of dividing the first signal into a plurality of blocks to generate first color information of each block from the first signal of each block, dividing the second signal into the plurality of blocks to generate second color information of each block from the second signal of each block, and dividing the added signal into the plurality of blocks to generate third color information of each block from the signal of each block; a black body locus data acquiring step of acquiring black body locus data for the added signal; a light source information determining step of performing first processing of independently determining first light source information on the first signal at the time of imaging and second light source information on the second signal at the time of the imaging based on distribution of the first color information, the black body locus data for the first signal, distribution of the second color information, and the black body locus data for the second signal during the second mode, and performing second processing of determining third light source information on the added signal at the time of the imaging based on distribution of the third color information and the black body locus data for the added signal during the first mode; a white balance gain calculating step of calculating white balance gains of the first signal and the second signal based on the first light source information and the second light source information and calculating a white balance gain of the added signal based on the third light source information.

Advantageous Effects of Invention

According to the present invention, there may be provided an imaging apparatus and a method of calculating a white balance gain capable of appropriately adjusting white balance while improving color reproducibility.

DESCRIPTION OF EMBODIMENTS

Hereinafter, embodiments of the present invention will be described with reference to the drawings.

Figure 1:
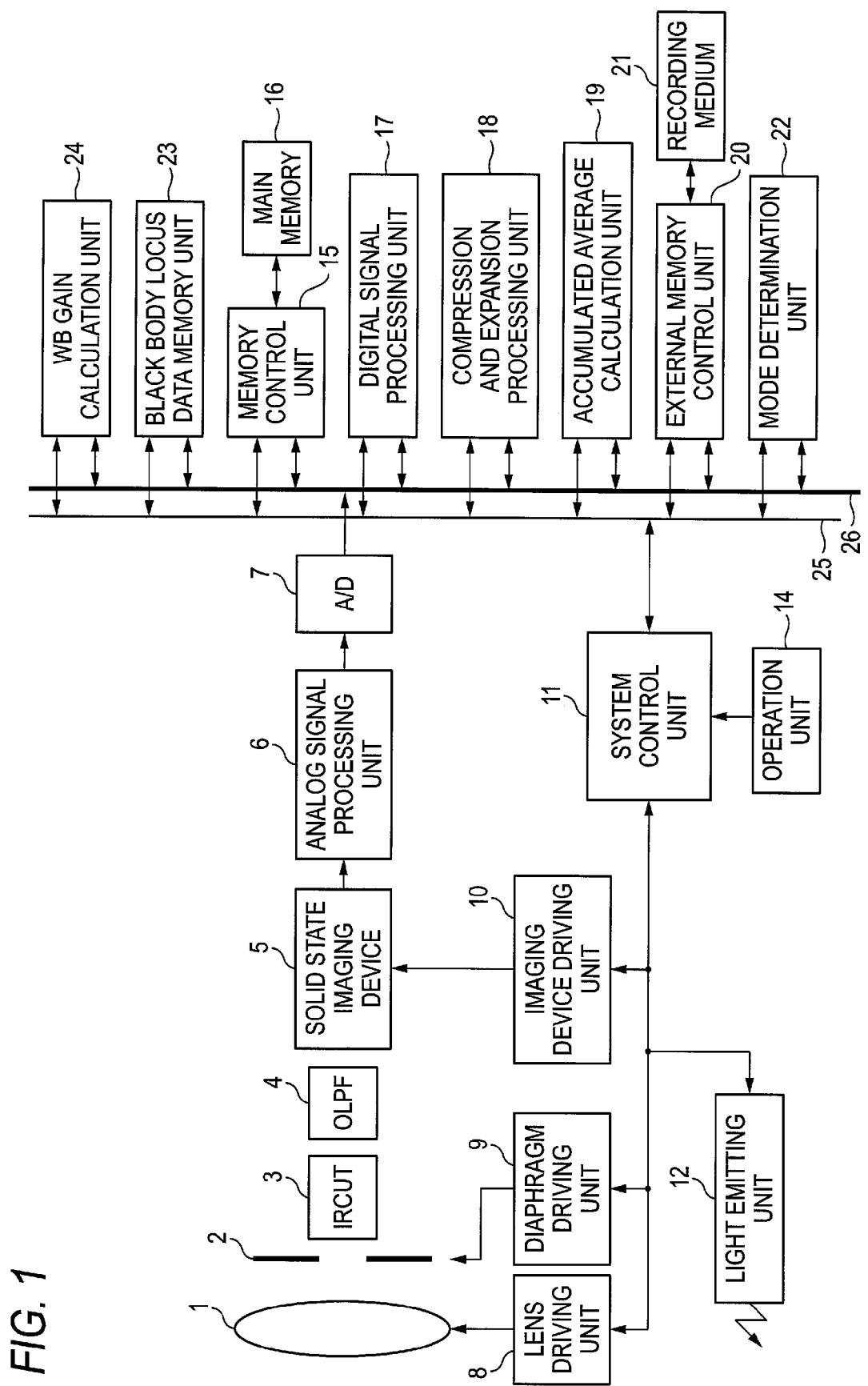
FIG. 1 is a diagram illustrating a schematic configuration of an imaging apparatus (digital camera) for describing an embodiment of the present invention.

FIG. 1 is a diagram illustrating a schematic configuration of an imaging apparatus for describing an embodiment of the present invention. The imaging apparatus includes an imaging apparatus such as a digital camera and a digital video camera and an imaging module mounted in an electronic endoscope and a mobile phone equipped with a camera, and the digital camera will be described herein, by way of an example.

An imaging system of the digital camera illustrated includes a photographing lens 1, a CCD type solid state imaging device 5, a diaphragm 2 mounted therebetween, an infrared cut filter 3, and an optical low pass filter 4.

A system control unit 11 integrally controlling the overall electric control system of the digital camera controls a flash light emitting unit 12. In addition, the system control unit 11 controls a lens driving unit 8 to adjust a position of the photographing lens 1 to a focus position or adjust a zoom. In addition, the system control unit 11 controls an opening size of the diaphragm 2 through a diaphragm driving unit 9 to control an exposure.

In addition, the system control unit 11 drives the solid state imaging device 5 through an imaging device driving unit 10 to output a subject image captured by the photographing lens 1 as an imaging signal. A command signal from a user is input to the system control unit 11 through an operation unit 14.

The electric control system of the digital camera also includes an analog signal processing unit 6 that is connected with an output of the solid state imaging device 5 and performs analog signal processing such as correlative double sampling processing and an A/D conversion circuit 7 that converts color signals (dot sequential imaging signals) of RGB output from the analog signal processing unit 6 into digital signals. The analog signal processing unit 6 and the A/D conversion circuit 7 are controlled by the system control unit 11.

In addition, the electric control system of the digital camera includes a main memory 16, a memory control unit 15 connected with the main memory 16, a digital signal processing unit 17, a compression and expansion processing unit 18 that compresses image data generated by a digital signal processing unit 17 into JPEG format or expands the compressed image data, an accumulated average calculation unit 19, an external memory control unit 20 connected with a recording medium 21 that is freely attached and detached, a mode determination unit 22, a black body locus data memory unit 23, and a white balance (WB) gain calculation unit 24.

The memory control unit 15, the digital signal processing unit 17, the compression and expansion processing unit 18, the accumulated average calculation unit 19, the external memory control unit 20, the mode determination unit 22, the black body locus data memory unit 23 and the WB gain calculation unit 24 are connected with each other by a control bus 25 and a data bus 26 and are thus controlled by a command from the system control unit 11.

The digital signal processing unit 17 performs the digital signal processing on the dot sequential imaging signal output from the solid state imaging device 5 and stored in the main memory 16 according to a command of the system control unit 11. In more detail, the digital signal processing unit 17 performs synchronization processing (processing of generating color information on red (R), green (G), and blue (B) at 1 sampling point by interpolation), white balance adjustment processing, gamma correction processing, luminance and chrominance signal generation processing, and the like and to generate image data of a type that is recorded in the recording medium 21.

The accumulated average calculation unit 19 calculates data required to calculate a WB gain that is used in the white balance adjustment processing. In detail, the accumulated average calculation unit 19 divides the imaging signal output from the solid state imaging device 5 and stored in the main memory 16 into n blocks (n is a natural number of 2 or more). Further, the accumulated average calculation unit 19 calculates accumulated average values of respective colors (an accumulated average value of an R signal, an accumulated average value of a G signal, and an accumulated average value of a B signal) for each division block.

The black body locus data memory unit 23 stores the black body locus data that is a locus of a change in color of a black body due to color temperature in a predetermined color space. Herein, details of the stored black body locus data will be described below.

The mode determination unit 22 determines an operation mode of the digital camera. The details will be described below, but the digital camera may set three modes of a HR (resolution priority) mode, a DR (dynamic range priority) mode, and a SN (high sensitivity, low noise priority) mode. The mode determination unit 22 determines by which of the three modes the imaging is performed.

The WB gain calculation unit 24 calculates a WB gain on the basis of an accumulated average value calculated by the accumulated average calculation unit 19, the black body locus data that is stored in the black body locus data memory unit 23, and the determination result of the mode determination unit 22. Here, the digital signal processing unit 17 performs the WB adjustment processing according to the calculated WB gain.

Figure 2:
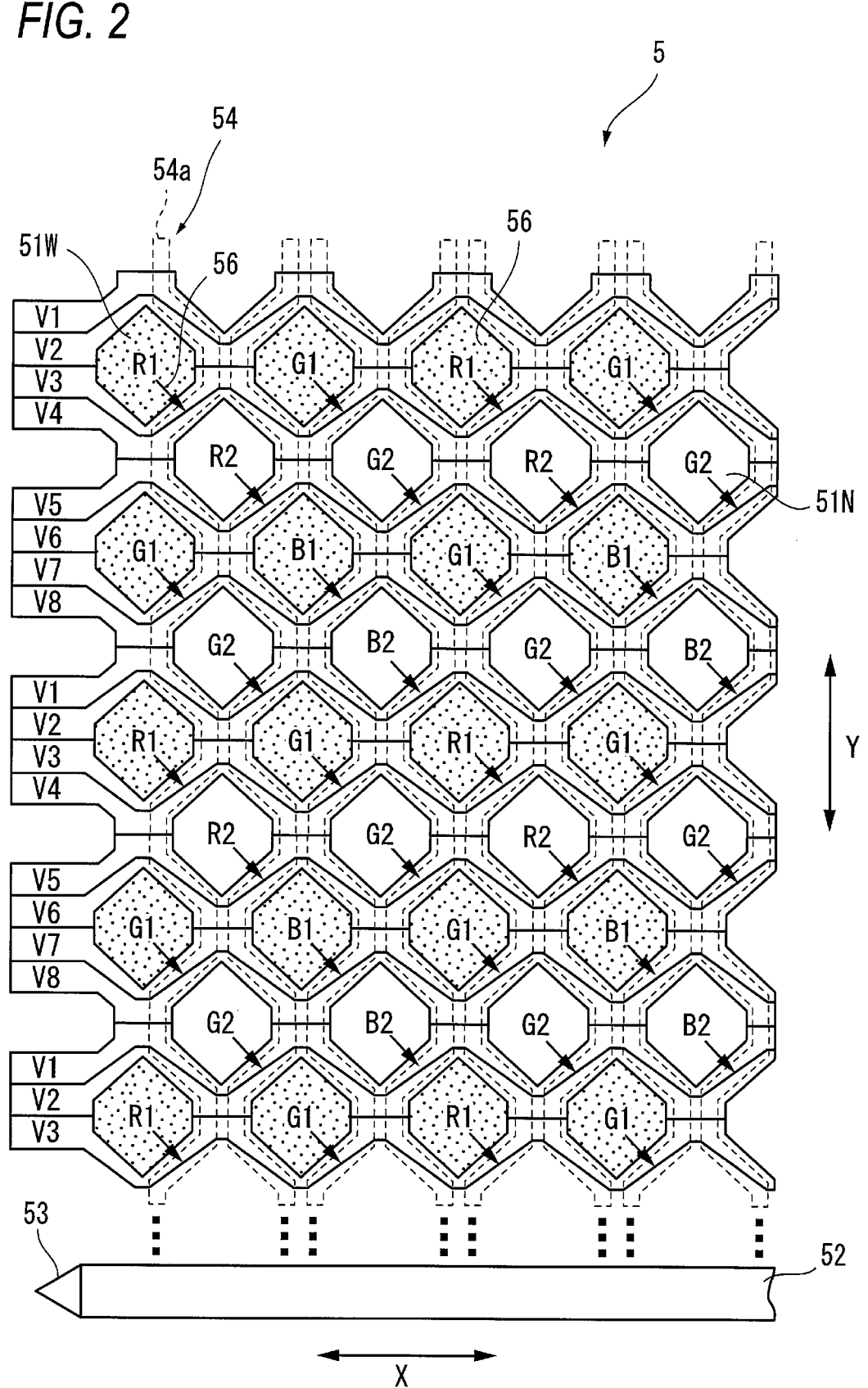
FIG. 2 is a schematic plan view illustrating a schematic configuration of a solid state imaging device in the digital camera illustrated in FIG. 1.

FIG. 2 is a plan view illustrating a schematic configuration of the solid state imaging device 5 in the digital camera illustrated in FIG. 1.

As illustrated in FIG. 2, the solid state imaging device 5 includes a first group formed with a plurality of photoelectric conversion elements 51W, a second group formed with a plurality of photoelectric conversion elements 51N, a plurality of vertical charge transmission units 54, a horizontal charge transmission unit 52, and an output unit 53.

All the photoelectric conversion elements included in the solid state imaging device 5 are disposed in a two-dimensional arrangement, that is, arranged in a column direction Y and a row direction X that intersects (in an example of FIG. 2, is orthogonal to) the column direction Y on a surface of a semiconductor substrate. All the photoelectric conversion elements include a first photoelectric conversion element column formed with the plurality of photoelectric conversion elements 51W that are lined up in the column direction Y and a second photoelectric conversion element column formed with the plurality of photoelectric conversion elements 51N that are lined up in the column direction Y. In addition, the first photoelectric conversion element columns and the second photoelectric conversion element columns are alternately lined up in parallel in the row direction X at a predetermined pitch. In addition, the first photoelectric conversion element column is displaced and arranged in the column direction Y by ½ of an array pitch in the column direction Y of the photoelectric conversion elements of each photoelectric conversion element column, with respect to the second photoelectric conversion element column. The arrangement may be obtained by disposing each photoelectric conversion element 51N at a position that is obliquely deviated in a 45° direction with respect to the corresponding photoelectric conversion element 51W that is disposed in a tetragonal lattice.

As such, each photoelectric conversion element 51N is provided adjacently to the photoelectric conversion elements 51W at the same position relationship (the same direction) with respect to the corresponding photoelectric conversion element 51W. Further, each photoelectric conversion element 51W and the corresponding photoelectric conversion element 51N that is adjacent to the photoelectric conversion element 51W at the same position relationship (adjacent in the same direction) configure a pair.

All the photoelectric conversion elements included in the solid state imaging device 5 have approximately the same configuration (the values in a design are the same). The approximately same configuration means that the size of the photoelectric conversion area (photodiode) formed within a semiconductor substrate is approximately the same and the opening size of a light shielding layer formed above the photoelectric conversion area is also approximately the same.

The first group formed with the photoelectric conversion elements 51W and the second group formed with the photoelectric conversion elements 51N are configured to independently control the exposure time. In this digital camera, the imaging device driving unit 10 performs a control that makes the exposure time of the first group and the exposure time of the second group different, such that signals having different sensitivities are obtained from the photoelectric conversion elements 51W of the first group and the photoelectric conversion elements 51N of the second group.

In the solid state imaging device 5, the photoelectric conversion elements 51W and the photoelectric conversion elements 51N that form pairs (are adjacent to each other at the same position relationship) satisfy the following conditions.

(1) Spectral sensitivity characteristics of the photoelectric conversion element 51W and the photoelectric conversion element 51N are different from each other.

(2) The wavelength range (for example, a half width in the spectral sensitivity characteristics of the photoelectric conversion element 51W) in which the photoelectric conversion element 51W mainly has the spectral sensitivity and the wavelength range (for example, a half width in the spectral sensitivity characteristics of the photoelectric conversion element 51N) in which the photoelectric conversion element 51N mainly has the spectral sensitivity fall within a wavelength range of light having a specific color in visible light.

(3) The half width in the spectral sensitivity characteristics of the photoelectric conversion element 51N is narrower than that in the spectral sensitivity characteristics of the photoelectric conversion element 51W.

(4) The value of the spectral sensitivity in each wavelength of the wavelength range in which the photoelectric conversion element 51W mainly has the spectral sensitivity is larger than that of the spectral sensitivity in each wavelength of the photoelectric conversion element 51N.

(5) The ratio (half width/peak value) of the peak value of the spectral sensitivity of the photoelectric conversion element 51W to the half width in the spectral sensitivity characteristics of the photoelectric conversion element 51W is larger than the ratio (half width/peak value) of the peak value of the spectral sensitivity of the photoelectric conversion element 51N to the half width in the spectral sensitivity characteristics of the photoelectric conversion element 51N.

Meanwhile, the wavelength range in which the photoelectric conversion element mainly has the spectral sensitivity means a signal according to the light in which most of the signals output from the photoelectric conversion element falls within the wavelength range and represents a range in which the signal according to the light other than the wavelength range little affects the signal output from the photoelectric conversion element. Hereinafter, the half width in the spectral sensitivity characteristics of each photoelectric conversion element will be described as the wavelength range in which each photoelectric conversion element mainly has the spectral sensitivity.

There may be several methods for making the spectral sensitivity characteristics different in the photoelectric conversion elements 51W and the photoelectric conversion elements 51N that form pairs, but the solid state imaging device 5 adopts a method of making spectral sensitivity characteristics of a color filter disposed above the photoelectric conversion elements different.

A color filter R1 transmitting red light, a color filter G1 transmitting green light, and a color filter B1 transmitting blue light are generally disposed above each photoelectric conversion element 51W in a Bayer array.

In FIG. 2, character "R1" is given to the photoelectric conversion element 51W above which the color filter R1 is disposed. Further, character "G1" is given to the photoelectric conversion element 51W above which the color filter G1 is disposed. Further, character "B1" is given to the photoelectric conversion element 51W above which the color filter B1 is disposed.

A color filter R2 transmitting red light, a color filter G2 transmitting green light, and a color filter B2 transmitting blue light are generally disposed above each photoelectric conversion element 51W in a Bayer array.

In FIG. 2, character "R2" is given to the photoelectric conversion element 51N above which the color filter R2 is disposed. Further, character "G2" is given to the photoelectric conversion element 51N above which the color filter G2 is disposed. Further, character "B2" is given to the photoelectric conversion element 51N above which the color filter B2 is disposed.

In the following description, the color filter R1 and the color filter R2 are collectively referred to as a red filter, the color filter G1 and the color filter G2 are collectively referred to as a green filter, and the color filter B1 and the color filter B2 are collectively referred to as a blue filter.

As described above, the filters of the same color (red filter, green filter, or blue filter) are disposed above each of the photoelectric conversion elements 51W and the photoelectric conversion elements 51N that form pairs. Therefore, it may be considered that the solid state imaging device 5 includes three kinds of pairs (R pair having a red filter disposed thereabove, G pair having a green filter disposed thereabove, and B pair having a blue filter disposed thereabove) having different colors of filters that are disposed at an upper portion of the solid state imaging device 5.

Meanwhile, a specific color is red in the condition (2) for each photoelectric conversion element of R pair. Meanwhile, a specific color is green in the condition (2) for each photoelectric conversion element of G pair. A specific color is blue in the condition (2) for each photoelectric conversion element of B pair.

In each photoelectric conversion element of R pair, the difference in spectral sensitivity characteristics is generated between the photoelectric conversion element 51W and the photoelectric conversion element 51N by making the spectral sensitivity characteristics of the color filter R1 and the color filter R2 different.

In each photoelectric conversion element of G pair, the difference in spectral sensitivity characteristics is generated between the photoelectric conversion element 51W and the photoelectric conversion element 51N by making the spectral sensitivity characteristics of the color filter G1 and the color filter G2 different.

In each photoelectric conversion element of B pair, the difference in spectral sensitivity characteristics is generated between the photoelectric conversion element 51W and the photoelectric conversion element 51N by making the spectral sensitivity characteristics of the color filter B1 and the color filter B2 different.

Hereinafter, the detailed example of the spectral sensitivity characteristics of each photoelectric conversion element of R pair, each photoelectric conversion element of G pair, and each photoelectric conversion element of B pair will be described.

Figure 3:
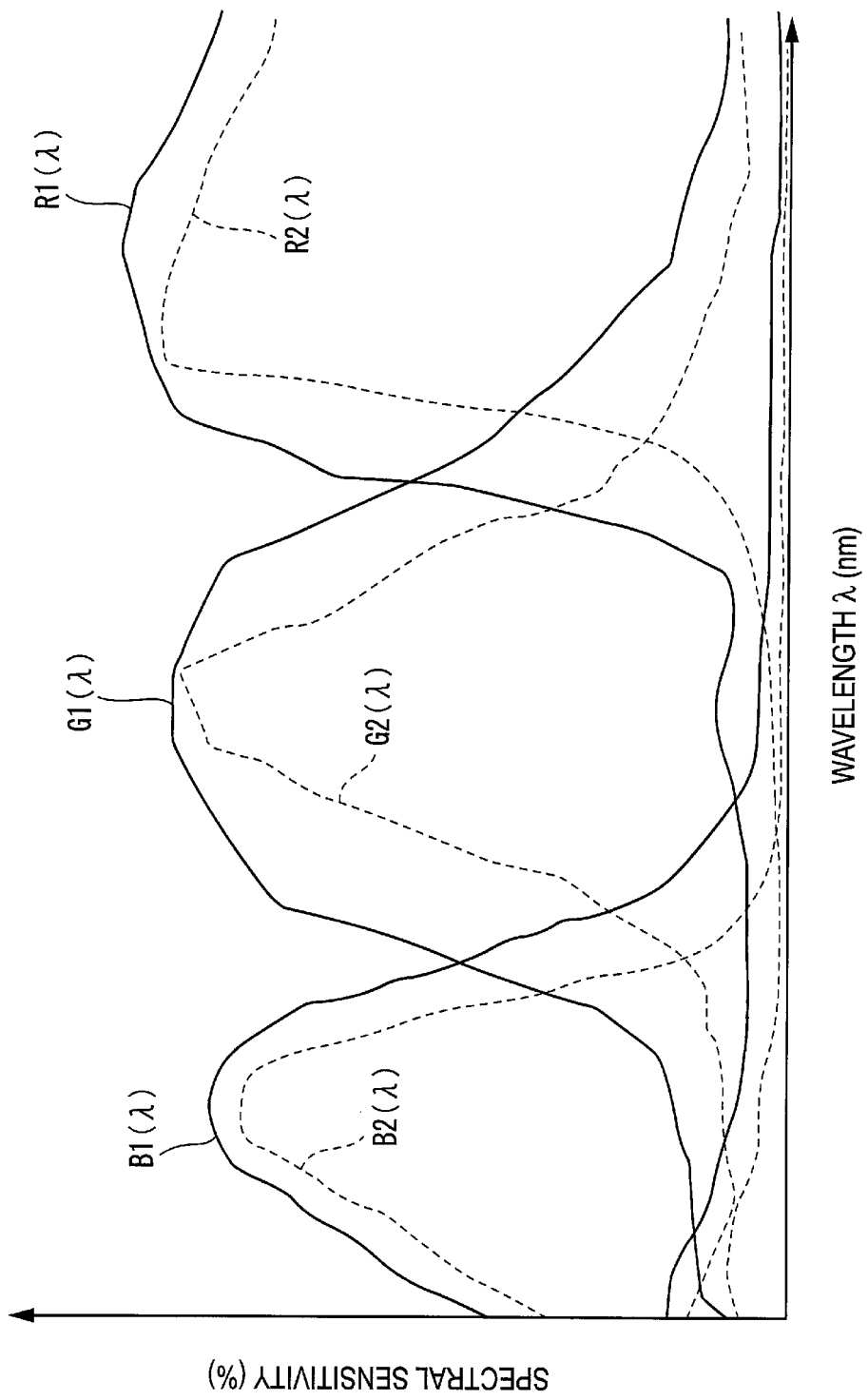
FIG. 3 is a diagram illustrating spectral sensitivity characteristics of a photoelectric conversion element 51W and a photoelectric conversion element 51N in the solid state imaging device illustrated in FIG. 2.

FIG. 3 is a diagram illustrating the spectral sensitivity characteristics of the photoelectric conversion element 51W and the photoelectric conversion element 51N in the solid state imaging device 5 illustrated in FIG. 2. In FIG. 3, characteristics denoted by reference numerals R1 ($\lambda$), G1 ($\lambda$), and B1 ($\lambda$) each represents the spectral sensitivity characteristics of the photoelectric conversion elements 51W above which the color filters R1, G1, and B1 are disposed, respectively. Further, characteristics denoted by reference numerals R2 ($\lambda$), G2 ($\lambda$), and B2 ($\lambda$) each represents the spectral sensitivity characteristics of the photoelectric conversion elements 51N in which the color filters R2, G2, and B2 are disposed, respectively.

In the example illustrated in FIG. 3, the value of the spectral sensitivity in each wavelength of the wavelength range (half width) in which the photoelectric conversion elements 51W of R pair mainly have the spectral sensitivity is larger than that of the spectral sensitivity in each wavelength of the photoelectric conversion elements 51N of R pair. Further, the half width in the spectral sensitivity characteristics R2 (λ) is narrower than that of the spectral sensitivity characteristics R1 (λ) and is located inside of that. Further, in the spectral sensitivity characteristics R1 (λ), the half width falls within a red wavelength range. In addition, the ratio of the peak value to the half width of the spectral sensitivity characteristics R1 (λ) is larger than the ratio of the peak value to the half width of the spectral sensitivity characteristic R2 (λ). Meanwhile, each half width in the spectral sensitivity characteristics R1 (λ) and R2 (λ) is set to a value in the wavelength range of visible light.

In the example illustrated in FIG. 3, the value of the spectral sensitivity in each wavelength of the wavelength range (half width) in which the photoelectric conversion elements 51W of G pair mainly have the spectral sensitivity is larger than that of the spectral sensitivity in each wavelength of the photoelectric conversion elements 51N of G pair. Further, the half width in the spectral sensitivity characteristics G2 (λ) is narrower than that of the spectral sensitivity characteristics G1 (λ) and is located inside of that. Further, in the spectral sensitivity characteristics G1 (λ), the half width falls within a green wavelength range. In addition, the ratio of the peak value to the half width of the spectral sensitivity characteristics G1 (λ) is larger than the ratio of the peak value to the half width of the spectral sensitivity characteristic G2 (λ).

In the example illustrated in FIG. 3, the value of the spectral sensitivity in each wavelength of the wavelength range (half width) in which the photoelectric conversion elements 51W of B pair mainly have the spectral sensitivity is larger than that of the spectral sensitivity in each wavelength of the photoelectric conversion elements 51N of B pair. Further, the half width in the spectral sensitivity characteristics B2 (λ) is narrower than that of the spectral sensitivity characteristics B1 (λ) and is located inside of that. Further, in the spectral sensitivity characteristics B1 (λ), the half width falls within a blue wavelength range. In addition, the ratio of the peak value to the half width of the spectral sensitivity characteristics B1 (λ) is larger than the ratio of the peak value to the half width of the spectral sensitivity characteristic B2 (λ). Meanwhile, each half width in the spectral sensitivity characteristics B1 (λ) and B2 (λ) is set to a value in the wavelength range of visible light.

As such, the conditions (1) to (5) described above may be satisfied by the spectral sensitivity characteristics illustrated in FIG. 3.

The plurality of vertical charge transmission units 54 is disposed one by one, corresponding to each photoelectric conversion element column and transmits charges read from each photoelectric conversion element of the corresponding photoelectric conversion element column in a column direction Y.

The vertical charge transmission unit 54 includes a charge transmission channel 54a formed within the semiconductor substrate and transmission electrodes V1 to V8 that are lined up in parallel in the column direction Y above the charge transmission channel 54a. The transmission electrodes V1 to V8 are configured to be supplied with driving pulses from the imaging device driving unit 10 and the vertical charge transmission unit 54 is driven by the driving pulse.

A charge reading area 56 (schematically represented by an arrow in FIG. 2) is formed between the charge transmission channel 54a and each photoelectric conversion element of the photoelectric conversion element column corresponding to the charge transmission channel 54a.

The transmission electrode V3 also covers a charge reading area 56 of the photoelectric conversion elements 51 W of an odd-numbered row counted from an end (top end) of an opposite portion to a portion at which the horizontal charge transmission unit 52 of the solid state imaging device 5 among the photoelectric conversion elements 51 W of the first group, and is used as the reading electrode for reading the charges from the photoelectric conversion element 51 W.

The transmission electrode V7 also covers the charge reading area 56 of the photoelectric conversion elements 51 W of an even-numbered row counted from the top end of the solid state imaging device 5 among the photoelectric conversion elements 51 W of the first group, and is used as the reading electrode for reading the charges from the photoelectric conversion elements 51 W.

The transmission electrode V5 also covers the charge reading area 56 of the photoelectric conversion elements 52N of an odd-numbered row counted from the top end of the solid state imaging device 5 among the photoelectric conversion elements 52N of the second group, and is used as the reading electrode for reading the charges from the photoelectric conversion elements 52N.

The transmission electrode V1 also covers the charge reading area 56 of the photoelectric conversion elements 52N of an odd-numbered row counted from the top end of the solid state imaging device 5 among the photoelectric conversion elements 52N of the second group, and is used as the reading electrode for reading the charges from the photoelectric conversion elements 52N.

The horizontal charge transmission unit 52 transmits charges transmitted through the plurality of vertical charge transmission units 54 in a row direction X.

The output unit 53 converts and outputs the charges transmitted through the horizontal charge transmission unit 52 into a signal according to the charge amount.

The digital camera configured as described above switches between three modes such as a DR mode, an HR mode, and an SN mode according to a scene or a manual operation, as described above.

In the DR mode, the imaging device driving unit 10 performs a DR driving. The DR driving refers to a driving in which signals are read from all the photoelectric conversion elements of the solid state imaging device 5 by making the exposure time of the first group and the second group different. In this mode, the digital signal processing unit 17 independently performs the digital signal processing on a signal group (hereinafter, referred to as a Surface A) read from each photoelectric conversion element of the first group and a signal group (hereinafter, referred to as a Surface B) read from each photoelectric conversion element of the second group to generate two pieces of image data (image data after the Surface A is processed and image data after the Surface B is processed). Further, the digital signal processing unit 17 combines the two pieces of image data to expand the dynamic range and generates the DR image data (the image data formed with pixel data corresponding to each of the photoelectric conversion elements that is a half of all the photoelectric conversion elements) with the improved color reproducibility.

In the HR mode, the imaging device driving unit 10 performs an HR driving. The HR driving refers to a driving in which signals are read from all the photoelectric conversion elements included in the solid state imaging device 5 by making the exposure time of the first group and the second group same. In this mode, the digital signal processing unit 17 performs the digital signal processing on a signal group (signals formed with the Surface A and the Surface B) read from all the photoelectric conversion elements to generate a piece of high-resolution HR image data (image data formed with pixel data corresponding to each of all the photoelectric conversion elements). Meanwhile, in this mode, since colors are different on the Surface A and the Surface B, the digital signal processing unit 17 may perform correction matching the colors.

In the SN mode, the imaging device driving unit 10 performs an SN driving. The SN driving refers to a driving in which the charges read from the photoelectric conversion elements 51W and 51N configuring a pair are mixed within the solid state imaging device 5 (for example, the horizontal charge transmission unit 52) by making the exposure time of the first group and the second group same to read the signal groups (hereinafter, referred to as a Surface AB) corresponding to all the pairs from the solid state imaging device 5. In this mode, the digital signal processing unit 17 performs the digital signal processing on the Surface AB to generate a piece of SN image data (image data formed with the pixel data corresponding to all the pairs). In this mode, since the charges of a pair are mixed within the solid state imaging device 5 and are then converted into the signals, sensitivity can be improved while reducing noise, such that the high-sensitive and low-noise SN image data may be generated.

In the DR mode, the digital signal processing unit 17 independently performs the white balance adjustment processing on the Surface A and Surface B. Since the Surface A and Surface B are data having different colors, the black body locus data for the Surface A and the black body locus data for the Surface B are respectively required, so as to calculate the optimal WB gains for the Surface A and Surface B.

In the HR mode, the digital signal processing unit 17 performs the white balance adjustment processing for the signal group formed with the Surface A and Surface B. Even in this case, since the Surface A and Surface B are data having different colors, there is a need to independently perform the WB adjustment on the Surface A and Surface B in order to make the white balance optimal. That is, even in this mode, the black body trajectory data for the Surface A and the black body trajectory data for the Surface B are respectively required.

In the SN mode, since the digital signal processing unit 17 performs the white balance adjustment processing on the Surface AB and as a result, it is necessary to keep the black body locus data for the Surface AB separately from the black body locus data for the Surface A and the black body locus data for the Surface B.

Therefore, in this digital camera, the black body locus data memory unit 23 stores three kinds of black body locus data such as the black body locus data for the Surface A, the Surface B, and the Surface AB.

Figure 4:
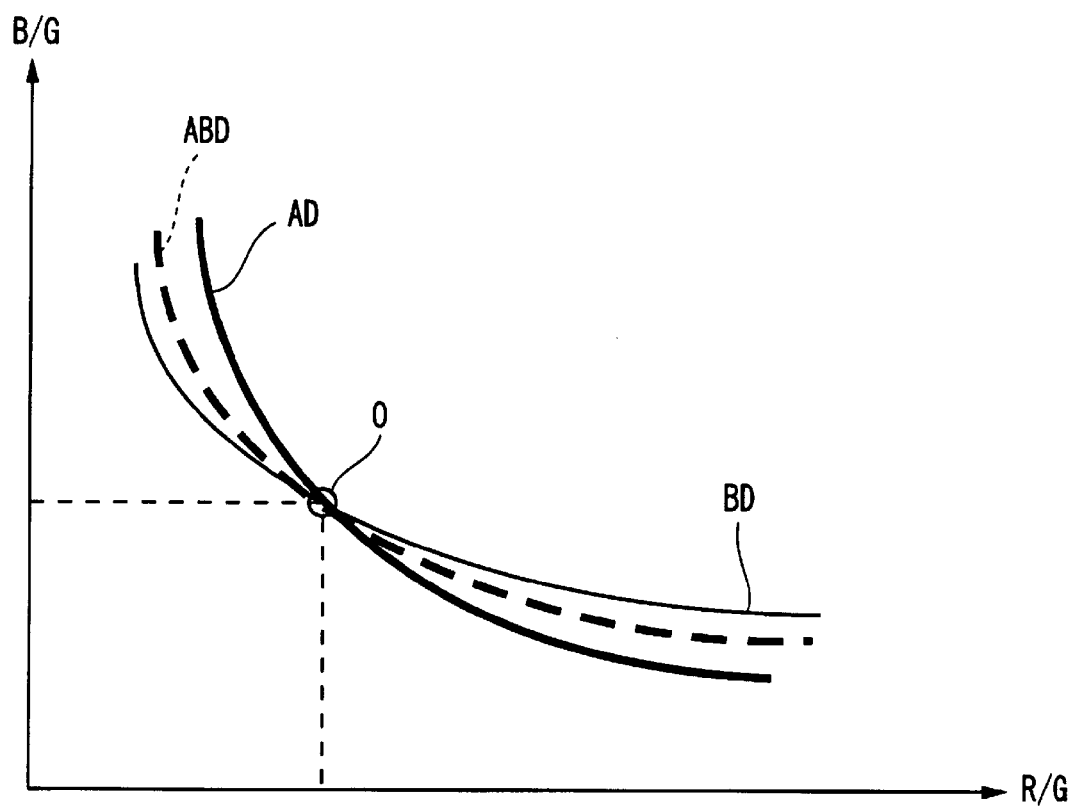
FIG. 4 is a diagram illustrating an example of a black body locus data that is stored in a black body locus data memory unit of the digital camera illustrated in FIG. 1.

The black body locus data for the Surface A is data representing a locus of a change in color of the black body on the Surface A when an imaging is performed in the DR mode or the HR mode while changing the color temperature of the light source. FIG. 4 illustrates an example of the black body locus data (denoted by reference numeral AD) for the Surface A. As for the color space, a vertical axis is set to be B/G and a horizontal axis is set to be R/G (referred to as B/G and R/G color space) herein, but the embodiment of the present invention is not limited thereto.

The black body trajectory data for the Surface B is data representing a trajectory of a change in color of the black body on the Surface B when imaging is performed in the DR mode or the HR mode while changing the color temperature of the light source. FIG. 4 illustrates an example of the black body trajectory data (denoted by reference numeral BD) for the Surface B.

The black body trajectory data for the Surface AB is data representing a trajectory of a change in color of the black body on the Surface AB when an imaging is performed in the SN mode while changing the color temperature of the light source. FIG. 4 illustrates an example of the black body trajectory data (denoted by reference numeral ABD) for the Surface AB.

In the example illustrated in FIG. 4, the black body trajectory data AD for the Surface A, the black body locus data BD for the Surface B, and the black body locus data ABD for the Surface AB are each normalized so as to cross each other at a reference point O at which the ratio of (B/G) and (R/G) is 1:1.

Meanwhile, the black body locus data AD and BD illustrated in FIG. 4 each represents results simulated based on spectral sensitivity characteristics of the photoelectric conversion elements 51W and 51N and a wavelength spectrum of illumination light having 1000 K to 10000 K. According to the simulated results, a curved line of the black body locus data AD is at a position farther away from an axis B/G than a curved line of the black body locus data BD in an area in which a value of the (R/G) is smaller than that of the reference point O at which the ratio of (B/G) and (R/G) becomes 1:1 and it is possible to obtain the black body locus data AD and BD at a position at which the curved line of the black body locus data AD more approaches an axis R/G than the curved line of the black body locus data BD in area in which the value of the (R/G) is larger than the reference point O.

Next, the details of a method of calculating a WB gain by the WB gain calculation unit 24 will be described below.

Figure 5:
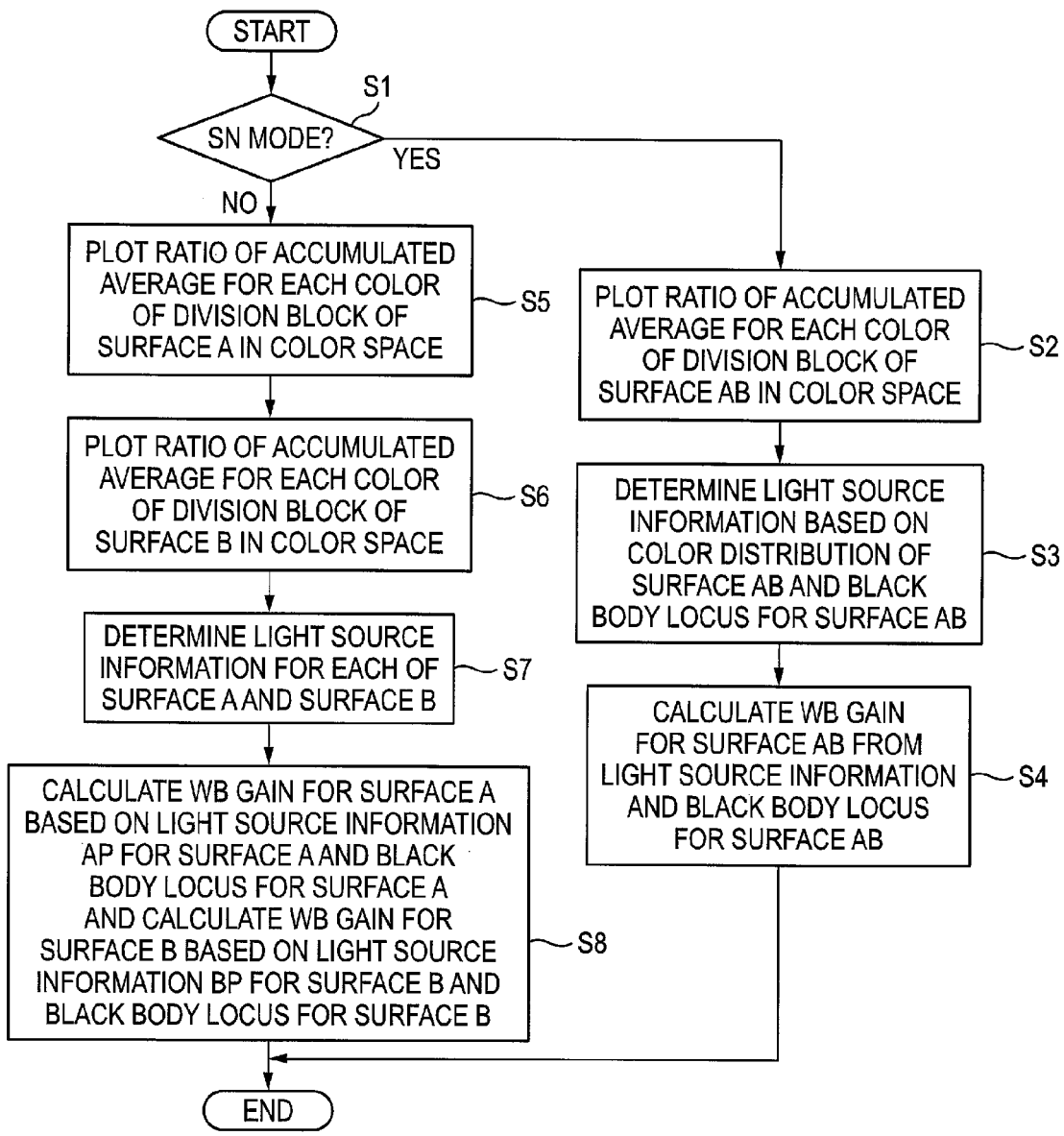
FIG. 5 is a flow chart for describing an operation of the digital camera illustrated in FIG. 1.

FIG. 5 is a flow chart for describing a method of calculating a WB gain in the digital camera illustrated in FIG. 1.

When the imaging is performed by the solid state imaging device 5, the imaging signal obtained by the imaging is stored in the main memory 16. Next, the mode determination unit 22 determines a mode of the digital camera at the time of imaging (step S1). The mode corresponds to one determined according to an operation of a subject or an operation unit 14 by the system control unit 11. For this reason, the mode determination unit 22 determines a mode by acquiring information on what mode the imaging is performed from the system control unit 11.

When it is determined that a mode is the SN mode (step S1: YES), since the Surface AB is stored in the main memory 16, the accumulated average calculation unit 19 divides the Surface AB into n blocks to calculate the accumulated average of each of the R signal, the G signal, and B signal that are present in each block.

Next, the WB gain calculation unit 24 calculates the ratio ((accumulated average of B signal/accumulated average of G signal) and (accumulated average of R signal/accumulated average of G signal)) of the accumulated average for each division block, and plots points at which the calculated two ratios are set as coordinates as the color information in the B/G and R/G color space (step S2). By the processing, n color information corresponding to n division blocks are plotted in the B/G and R/G color space to generate n color information.

Next, the WB gain calculation unit 24 acquires the black body locus data ABD from the black body locus data memory unit 23 and determines the color information (hereinafter, referred to as light source information) of the surrounding light source at the time of imaging among the n color information based on the black body locus data ABD and a distribution of n color information generated at step S2 (step S3). The method of determining the light source information uses the known method.

Next, the WB gain calculation unit 24 calculates the WB gain for the Surface AB based on the determined light source information and the black body locus data ABD (step S4). Specifically, the WB gain calculation unit 24 calculates the gain required to move the determined light source information to the reference point O of the black body locus data ABD as the WB gain for the Surface AB.

When it is determined at step S1 that a mode is the HR mode or the DR mode (step S1: No), since the Surface A and Surface B are stored in the main memory 16, the accumulated average calculation unit 19 divides the Surface A and Surface B into n blocks, respectively, to calculate the accumulated average of each of the R signal, the G signal, and B signal that are present in each block.

Next, the WB gain calculation unit 24 calculates the ratio of the accumulated average for each division block of the Surface A and plots the points at which the calculated two ratios are set as coordinates as the color information in the B/G and R/G color information (step S5).

Next, the WB gain calculation unit 24 calculates the ratio of the accumulated average for each division block of the Surface B and plots the points at which the calculated two ratios are set as coordinates as the color information in the B/G and R/G color information (step S6).

By the processing of the steps S5 and S6, n color information corresponding to n division blocks of the Surface A and n color information corresponding to n division blocks of the Surface B are plotted in the B/G and R1G color space to generate a sum of (2×n) color information.

Next, the WB gain calculation unit 24 acquires the black data locus data AD and the black body locus data BD from the black body locus data memory unit 23 and separately determines the light source information on the Surface A and Surface B based on the black body locus data AD, the black body locus data BD, and the (2×n) color information acquired at steps S5 and S6 (step S7).

In detail, the WB gain calculation unit 24 determines the color information (hereinafter, referred to as light source information (AP)) of the surrounding light source for the Surface A at the time of imaging among the n color information, based on the black body locus data AD and the distribution of the n color information corresponding to the Surface A.

Further, the WB gain calculation unit 24 determines the color information (hereinafter, referred to as light source information (BP)) of the surrounding light source for the Surface B at the time of imaging among the n color information, based on the black body locus data BD and the distribution of the n color information corresponding to the Surface B.

The method of determining the light source information AP and BP uses the known method.

Next, the WB gain calculation unit 24 calculates the WB gain for the Surface A based on the black body locus data AD and the light source information AP that are determined at step S7 and calculates the WB gain for the Surface B based on the light source information BP and the black body locus data BD (step S8).

Specifically, the WB gain calculation unit 24 calculates the gain required to move the light source information AP to the reference point O of the black body locus data AD as the WB gain for the Surface A and calculates the gain required to move the light source information BP to the reference point O of the black body locus data BD as the WB gain for the Surface B.

As described above, according to the digital camera, it is possible to independently calculate the optimal WB gains on the Surface A, the Surface B, and the Surface AB. For this reason, it is possible to realize the appropriate white balance at any one of the DR mode, the HR mode, and the SN mode, thereby making it possible to realize the wide D range imaging, the high-resolution imaging, and the high sensitive or low noise imaging while improving the color reproducibility.

In addition, according to the digital camera, the wavelength range in which the pair of the photoelectric conversion elements 51N mainly have the spectral sensitivity is completely included in the wavelength range in which the pair of the photoelectric conversion elements 51W mainly have the spectral sensitivity. For this reason, the correlation between the signals obtained from the pair can be increased, such that in the DR mode, the image data having high quality and wide D range may be generated and in the SN mode, the image data that has high quality, high sensitivity, and low noise may be generated.

Meanwhile, in the digital camera, both of the DR mode and the HR mode may not be present as for the mode other than the SN mode, or, only any one thereof may be set.

In addition, in the SN mode, after the signals according to the charge are added in the analog signal processing unit 6 in the state of the analog signal without mixing the charges read from each pair of the photoelectric conversion elements within the horizontal charge transmission unit 52, the SN image data may also be generated by setting the signal after the adding to be the Surface AB and performing the digital signal processing on the Surface AB. The signals corresponding to the pair obtained by mixing the charges read from each pair of the photoelectric conversion elements within the horizontal charge transmission unit 52 and the signals obtained by adding the signals read from each pair of the photoelectric conversion elements in the analog signal processing unit 6 in the analog signal state only and corresponded to the pair have a different noise amount and may be considered to be approximately the same signal. For this reason, the processing of mixing the charges read from each pair of the photoelectric conversion elements within the solid state imaging device 5 may be again regarded as the processing of adding the signals read from the pair of the photoelectric conversion elements within the solid state imaging device 5.

Further, in the foregoing description, the black body locus data ABD is stored in the black body locus data memory unit 23, which is not essential. When the black body locus data ABD is not stored, the WB gain calculation unit 24 generates the black body locus data ABD from the black body locus data AD and the black body locus data BD by the operation to acquire the black body locus data ABD.

Next, a modified embodiment of the digital camera illustrated in FIG. 1 will be described.

(First Modified Embodiment)

Figure 6:
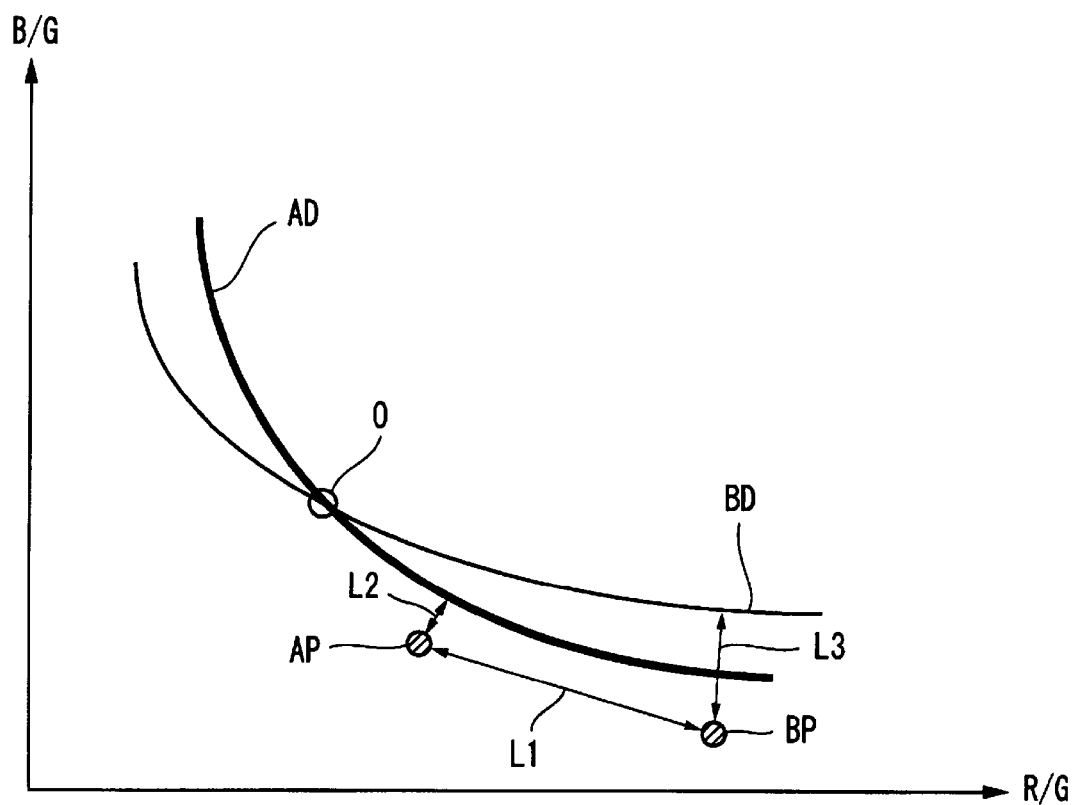
FIG. 6 is a diagram for describing features of a digital camera that is a first modified embodiment of the digital camera illustrated in FIG. 1.

FIG. 6 is a diagram illustrating an example of positions in the B/G and R/G color space of the light source information AP and BP determined at step S7 of FIG. 5. As illustrated in FIG. 6, when a distance L1 is large in the B/G and R/G color space of the light source information AP and the light source information BP, which of the light source information is highly likely to be wrongly determined.

Therefore, in the digital camera of the first modified embodiment, in the case of the DR mode and the HR mode, when the distance L1 exceeds the threshold, the WB gain calculation unit 24 compares the distance L2 between the light source information AP and the black body locus data AD with the distance L3 between the light source information BP and the black body locus data BD to change any of the light source information AP and the light source information BP according to the comparison result.

Specifically, the WB gain calculation unit 24 changes the light source information BP based on the light source information AP when L3>L2 as illustrated in FIG. 6, and changes the light source information AP based on the light source BP when L2>L3.

Hereinafter, a WB gain calculation operation of the digital camera according to the first modified embodiment will be described. Since only step S8 in a flow chart illustrated in FIG. 5 is changed in the operation, only the changed portion will be described below.

Figure 7:
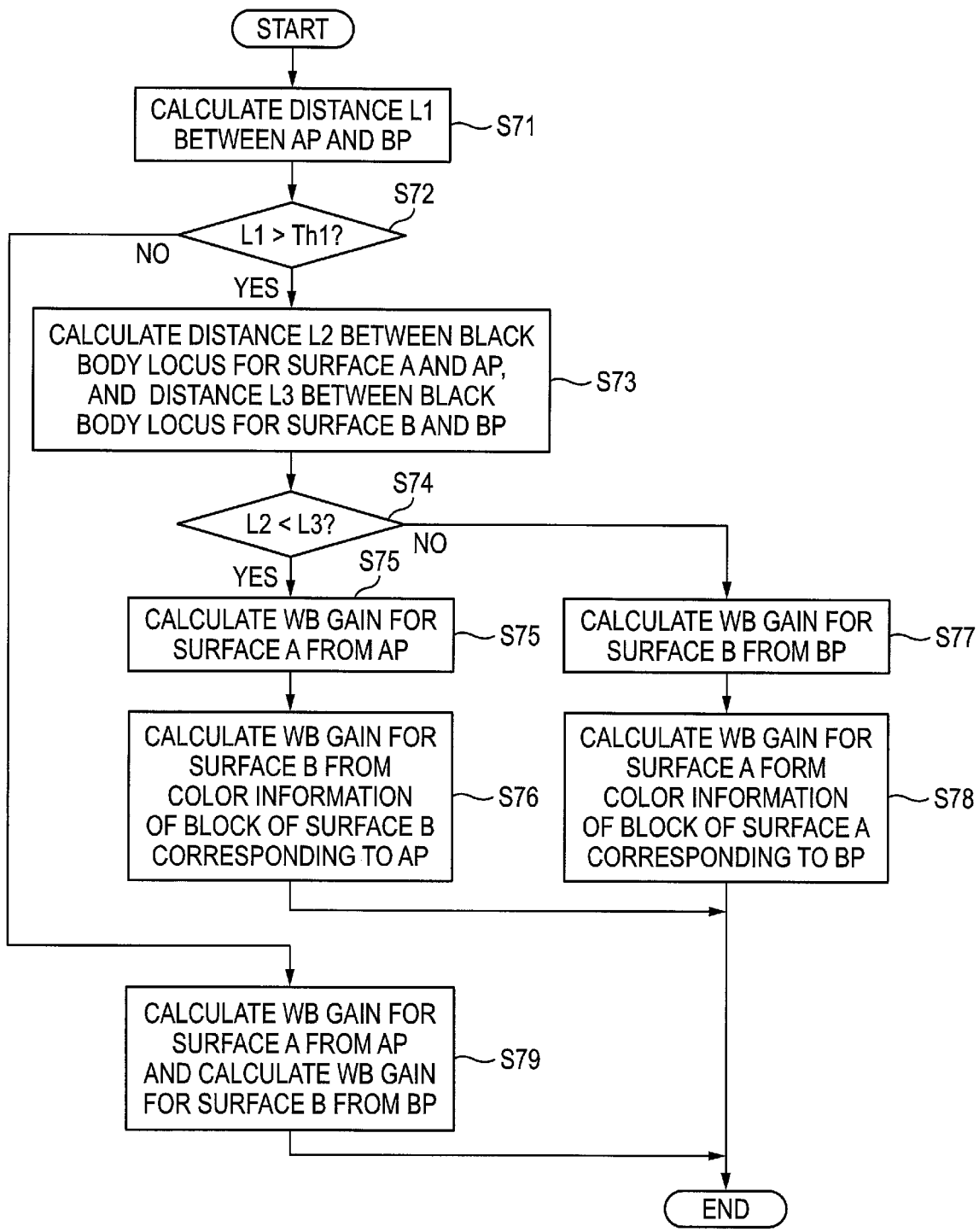
FIG. 7 is a flow chart for describing an operation of the digital camera that is the first modified embodiment of the digital camera illustrated in FIG. 1.

FIG. 7 is a flow chart for describing an operation of the digital camera according to the first modified embodiment of the digital camera illustrated in FIG. 1 and illustrates a modified embodiment of step S8 in the flow chart illustrated in FIG. 5.

When the light source information AP and the light source information BP are determined at step S7 of FIG. 5, the WB gain calculation unit 24 calculates the distance L1 in the B/G and R/G color space between the light source information AP and the light source information BP.

Next, the WB gain calculation unit 24 determines whether the calculated distance L1 exceeds a threshold Th1 (step S72). When the threshold Th1 is larger than that, the threshold Th1 becomes a value that cannot maintain the determination precision of the light source information.

When the determination result at S72 is "NO", the WB gain calculation unit 24 calculates the WB gain for the Surface A based on the light source information AP and the black body locus data AD that are determined at step S7, and calculates the WB gain for the Surface B based on the light source information BP and the black body locus data BD that are determined at step S7 (step S79).

Specifically, the WB gain calculation unit 24 calculates the gain required to move the light source information AP to the reference point O of the black body locus data AD as the WB gain for the Surface A and calculates the gain required to move the light source information BP to the reference point O of the black body locus data BD as the WB gain for the Surface B.

When the determination result at step S72 is "YES", the WB gain calculation unit 24 calculates the L2 between the light source information AP and the black body locus data AD and the distance L3 between the light source information BP and the black body locus data BD (step S73).

Meanwhile, the distance L2 is a straight length that connects the light source information AP and the black body locus data AD at the shortest distance and the distance L3 is a straight length that connects the light source information BP and the black body locus data BD at the shortest distance.

Next, the WB gain calculation unit 24 compares the calculated distance L2 with the calculated distance L3 (step S74). When the comparison result is L2<L3 (step S74: YES), the WB gain calculation unit 24 calculates the gain required to move the light source information AP determined at step S7 to the reference point O of the black body locus data AD as the WB gain for the Surface A (step S75).

Next, the WB gain calculation unit 24 calculates the gain required to move the light source information BP to the reference point O of the black body locus data BD as the WB gain for the Surface B by using the color information obtained from the block of the Surface B having the same coordinates as the block of the Surface A obtaining the light source information AP as the light source information BP (step S76).

When the comparison result at step S74 is L2>L3 (step S74: NO), the WB gain calculation unit 24 calculates the gain required to move the light source information BP determined at step S7 to the reference point O of the black body locus data BD as the WB gain for the Surface B (step S77).

Next, the WB gain calculation unit 24 calculates the gain required to move the light source information AP to the reference point O of the black body locus data AD as the WB gain for the Surface A by using the color information obtained from the block of the Surface A having the same coordinates as the block of the Surface B obtaining the light source information BP as the light source information AP (step S78).

As described above, when the light source information is likely to be erroneously determined, the digital camera according to the first modified embodiment uses the light source information at a position close to the black body locus data as it is and changes the light source information at a position far away from the black body data to light source information substantially matching the light source information at the portion close to the black body locus data. Since the light source information close to the black body data is considered to have a high reliability, the determination precision of the light source information can be improved by doing this and thus, the WB gain can be appropriately calculated.

(Second Modified Embodiment)

Figure 8:
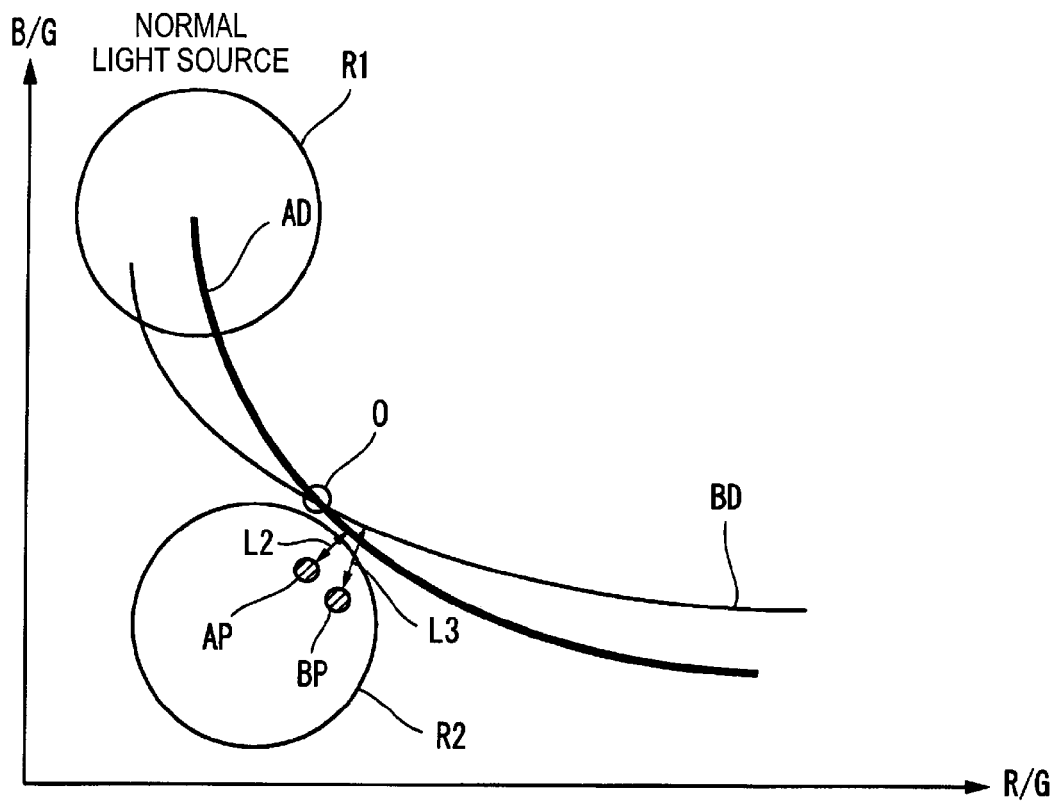
FIG. 8 is a diagram for describing features of a digital camera that is a second modified embodiment of the digital camera illustrated in FIG. 1.
Figure 9:
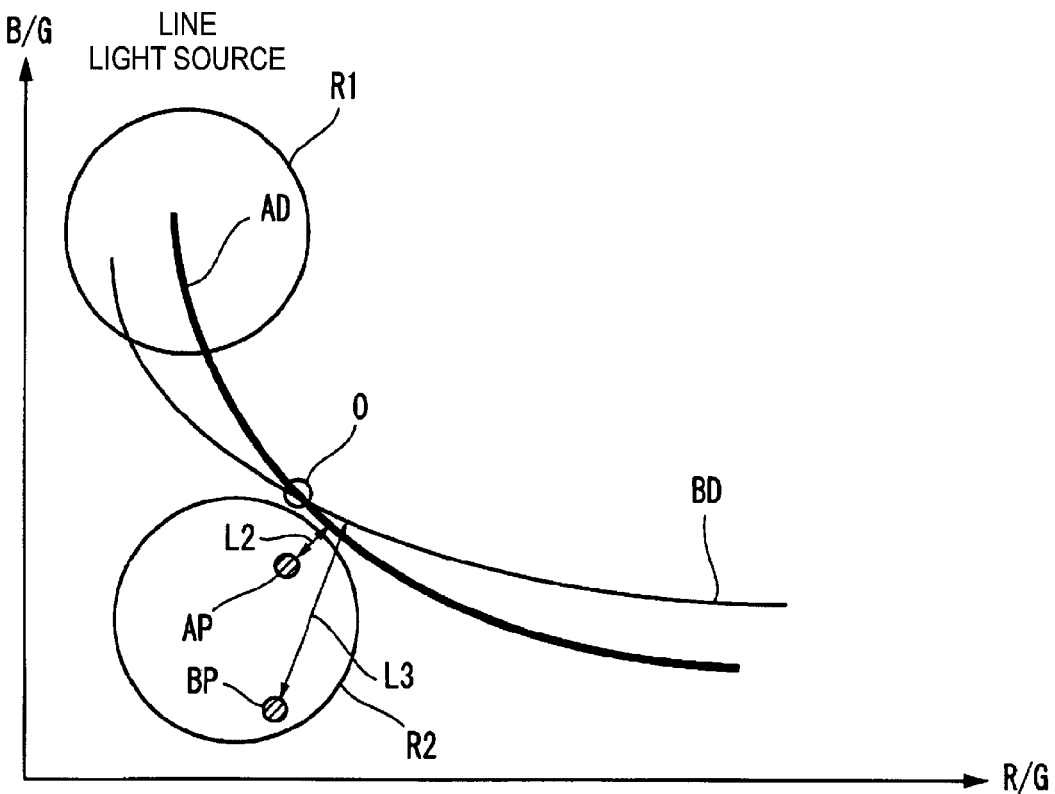
FIG. 9 is a diagram for describing features of a digital camera that is the second modified embodiment of the digital camera illustrated in FIG. 1.

FIG. 8 is a diagram illustrating an example of positions in the B/G and R/G color space of the light source information AP and BP determined at step S7 of FIG. 5 when the light source at the time of imaging is a general light source that does not have a bright line. FIG. 9 is a diagram illustrating an example of positions of the light source information AP and BP when the light source of FIG. 8 is a bright line light source having a bright line such as a fluorescent lamp. Areas R1 and R2 illustrated in FIGS. 8 and 9 represent an area in which color information of a sky-blue and a natural white fluorescent lamp is plotted and an area in which color information of green and white fluorescent lamps is plotted, respectively.

In the case where the light source information AP and BP are present in the area R2, when the light source is a normal light source, the difference between the distance L2 between the light source information AP and the black body locus data AD and the distance L3 between the light source information BP and the black body locus data BD is small. In contrast, when the light source is a bright line light source, as illustrated in FIG. 9, the light source information BP is affected by the bright line to be far away from the black body locus data BD, such that the difference between the distance L2 and the distance L3 is increased. This phenomenon similarly occurs even when the light source information AP and BP is present in the area R1. This phenomenon occurs because a pair of the photoelectric conversion element 51N and the photoelectric conversion element 51W satisfies the conditions (1) to (4) described above.

When the light source is a blue sky or a natural white fluorescent lamp, the light source information AP and BP enter the area R1 and when the light source is the green or white fluorescent lamp, the light source information AP and BP enters the area R2. That is, it is easy that each of the blue sky and natural white fluorescent lamps and each of the green and white fluorescent lamps can each be erroneously determined.

In the digital camera illustrated in FIG. 1, the spectral characteristics changes in the photoelectric conversion element 51W and the photoelectric conversion element 51N. For this reason, as illustrated in FIGS. 8 and 9, the light source (natural white fluorescent lamp and white fluorescent lamp) having a bright line and a light source (sky blue and green) that does not have a bright line can be differentiated based on the size of the distance L2 and L3.

Therefore, in the digital camera according to the second modified embodiment, in the case of the DR mode and the HR mode, when the light source information AP and the light source information BP are present in any one of the area R1 and the area R2, the WB gain calculation unit 24 compares the distance L2 between the light source information AP and the black body locus data AD with the distance L3 between the light source information BP and the black body locus data BD and changes the process of calculating the white balance gains of the Surface A and Surface B according to the comparison result.

Specifically, when the value obtained by subtracting the distance L2 from the distance L3 is a threshold Th2 or less, the WB gain calculation unit 24 calculates the WB gain for the Surface A and the WB gain for the Surface B so as to be smaller as compared with the case in which the value exceeds the threshold Th2.

Hereinafter, the WB gain calculation operation of the digital camera according to the second modified embodiment will be described. Since only step S8 in a flow chart illustrated in FIG. 5 is changed in the operation, only the changed portion will be described below.

Figure 10:
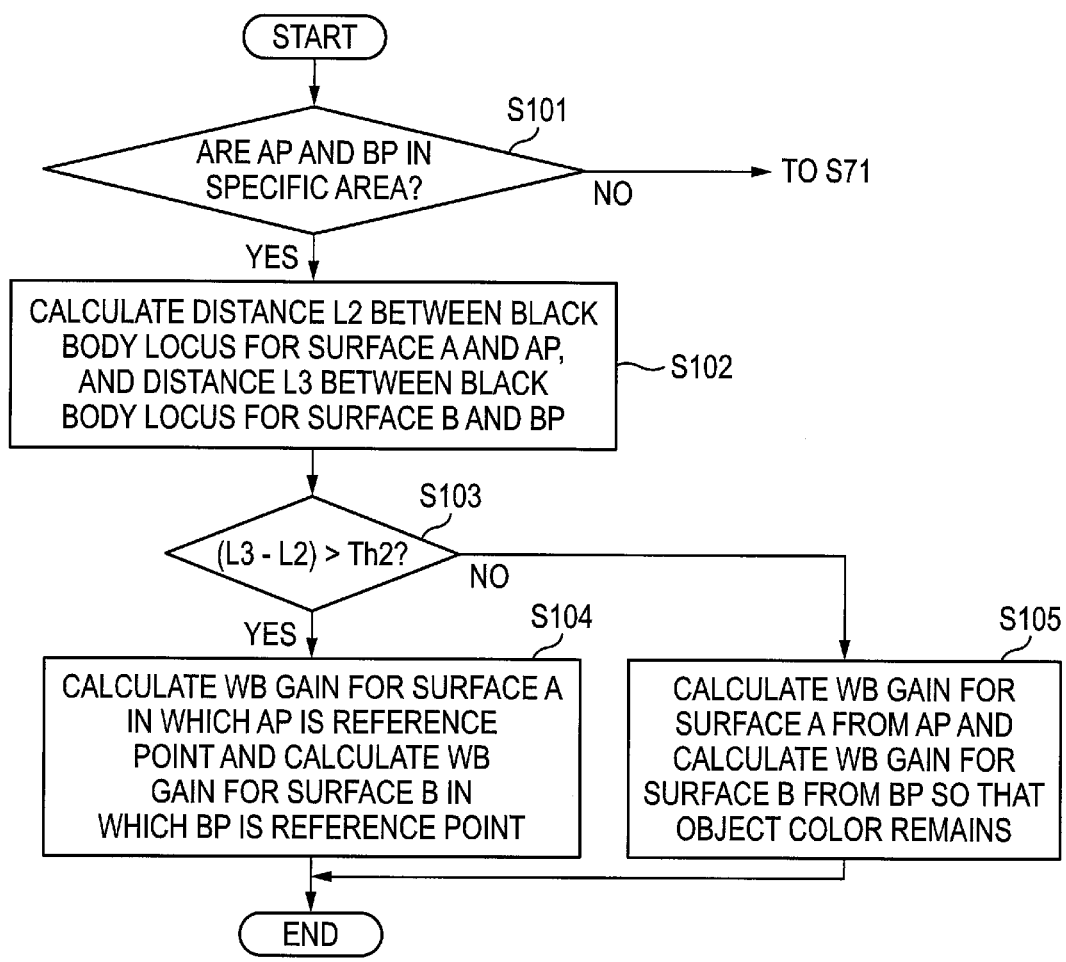
FIG. 10 is a flow chart for describing an operation of the digital camera that is the second modified embodiment of the digital camera illustrated in FIG. 1.

FIG. 10 is a flow chart for describing the operation of the digital camera according to the second modified embodiment of the digital camera illustrated in FIG. 1 and illustrates a modified embodiment of step S8 in the flow chart illustrated in FIG. 5.

After the light source information AP and the light source information BP are determined at step S7 of FIG. 5, the WB gain calculation unit 24 determines whether the light source information AP and the light source information BP are included in the areas R1 and R2 (step S101).

When the determination result at step S101 is "NO", the WB gain calculation unit 24 performs the processing after step S71 illustrated in FIG. 7.

When the determination result at step S101 is "YES", the WB gain calculation unit 24 calculates the distance L2 between the light source information AP and the black body locus data AD and the distance L3 between the light source information BP and the black body locus data BD (step S102).

Next, the WB gain calculation unit 24 determines whether the value obtained by subtracting the L2 from the L3 exceeds the threshold Th2 (step S103). When the threshold Th2 is larger than that, the threshold Th2 is a value enough to determine that it is affected by the bright line.

When the determination result at step S103 is "YES", it may be determined that the case is in the state illustrated in FIG. 9, that is, the light source is a fluorescent lamp. In this case, the WB gain calculation unit 24 calculates the gain required to move the light source information AP to the reference point O of the black body locus data AD as the WB gain for the Surface A and calculates the gain required to move the light source information BP to the reference point O of the black body locus data BD as the WB gain for the Surface B (step S104).

When the determination result at step S103 is "NO", it may be determined that the case is in the state illustrated in FIG. 8, that is, the light source is an object color such as green and blue sky. In this case, the WB gain calculation unit 24 calculates the WB gain having a smaller gain than the WB gain calculated at step S104 so that the object color remains (step S105). It is empirically determined how much the gain is decreased.

As described above, according to the digital camera of the second modified embodiment, it is possible to clearly differentiate the fluorescent lamp and the object color by comparing the distance L3 with the distance L2 even when it may be determined that the light source is any one of the fluorescent lamp and the object color. For this reason, it is possible to improve the precision of the white balance adjustment.

(Third Modified Embodiment)

Figure 11:
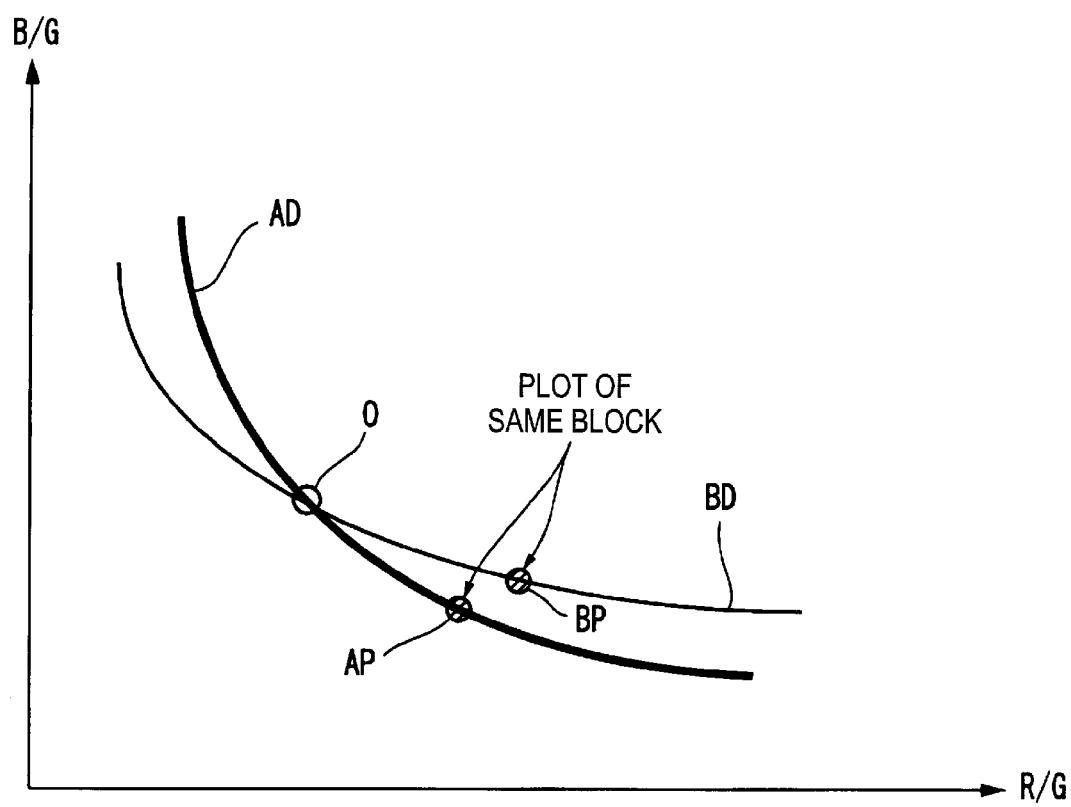
FIG. 11 is a diagram for describing features of a digital camera that is a third modified embodiment of the digital camera illustrated in FIG. 1.

FIG. 11 is a diagram illustrating an example of positions in the B/G and R/G color space of the light source information AP and BP determined at step S7 of FIG. 5. As illustrated in FIG. 11, when the light source information AP is in a substantially constant error distance on the black body locus data AD or in the black body locus data AD, the light source information BP is in a substantially constant error distance on a black body locus data BD or in the black body locus data BD, and when the light source information AP and the light source information BP are obtained from the same block, the probability that the light source information AP and the light source information BP are accurate light sources is high.

Therefore, in the digital camera according to the third modified embodiment, when the WB gain calculation unit 24 determines the light source information AP and BP, the color information of the Surface A carried in the black body locus data AD is present, the color information of the Surface B carried in the black body locus data BD is present, and when these color information are the color information of the same block, the two pieces of color information are determined as the light source information at the time of imaging.

Hereinafter, the WB gain calculation operation of the digital camera according to the third modified embodiment will be described. Since only step S7 in a flow chart illustrated in FIG. 5 is changed in the operation, only the changed portion will be described below.

Figure 12:
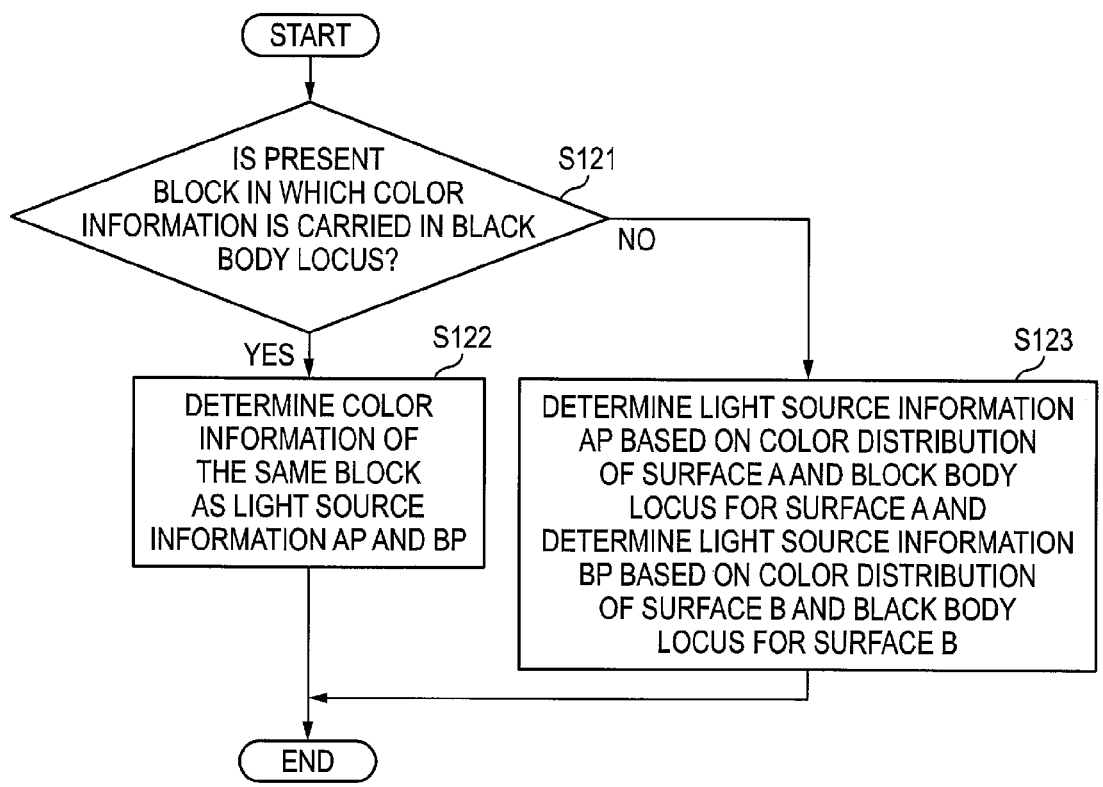
FIG. 12 is a flow chart for describing an operation of the digital camera that is the third modified embodiment of the digital camera illustrated in FIG. 1.

FIG. 12 is a flow chart for describing an operation of the digital camera according to the third modified embodiment of the digital camera illustrated in FIG. 1 and illustrates a modified embodiment of step S7 in the flow chart illustrated in FIG. 5.

After the color information is generated in the steps S5 and S6 illustrated in FIG. 5, the WB gain calculation unit 24 determines whether the same block in which the color information on the Surface A and the Surface B are carried in the black body locus data AD and BD, respectively, is present (step S121).

When the determination result at step S121 is "NO", the WB gain calculation unit 24 acquires the black body locus data AD and the black body locus data BD from the black body locus data memory unit 23 and separately determines the light source information on the A and Surface Bs based on the black body locus data AD, the black body locus data BD, the distribution of the color information of the Surface A, and the distribution of the color information of the Surface B (step S123). Herein, the determination of the light source information is performed by the known method.

When the determination result at step S121 is "YES", the WB gain calculation unit 24 determines the color information of the same block as the light source information AP and BP (step S122).

After the steps S122 and S123, the WB gain calculation unit 24 calculates the WB gain for the Surface A and the WB gain for the Surface B based on the determined light source information AP and BP, the black body locus data AD, and the black body locus data BD (step S8).

Specifically, the WB gain calculation unit 24 calculates the gain required to move the light source information AP to the reference point O of the black body locus data AD as the WB gain for the Surface A and calculates the gain required to move the light source information BP to the reference point O of the black body locus data BD as the WB gain for the Surface B.

As described above, according to the digital camera of the third modified embodiment, when the same block in which the color information is carried in the black body locus data is present, the color information of the block is determined as the light source information and thus, a workload to be processed until the light source information is determined may be reduced. Further, when the color information is present, the color information is highly likely to be the color information of the light source and thus, the light source information may be accurately determined.

(Fourth Modified Embodiment)

Figure 13:
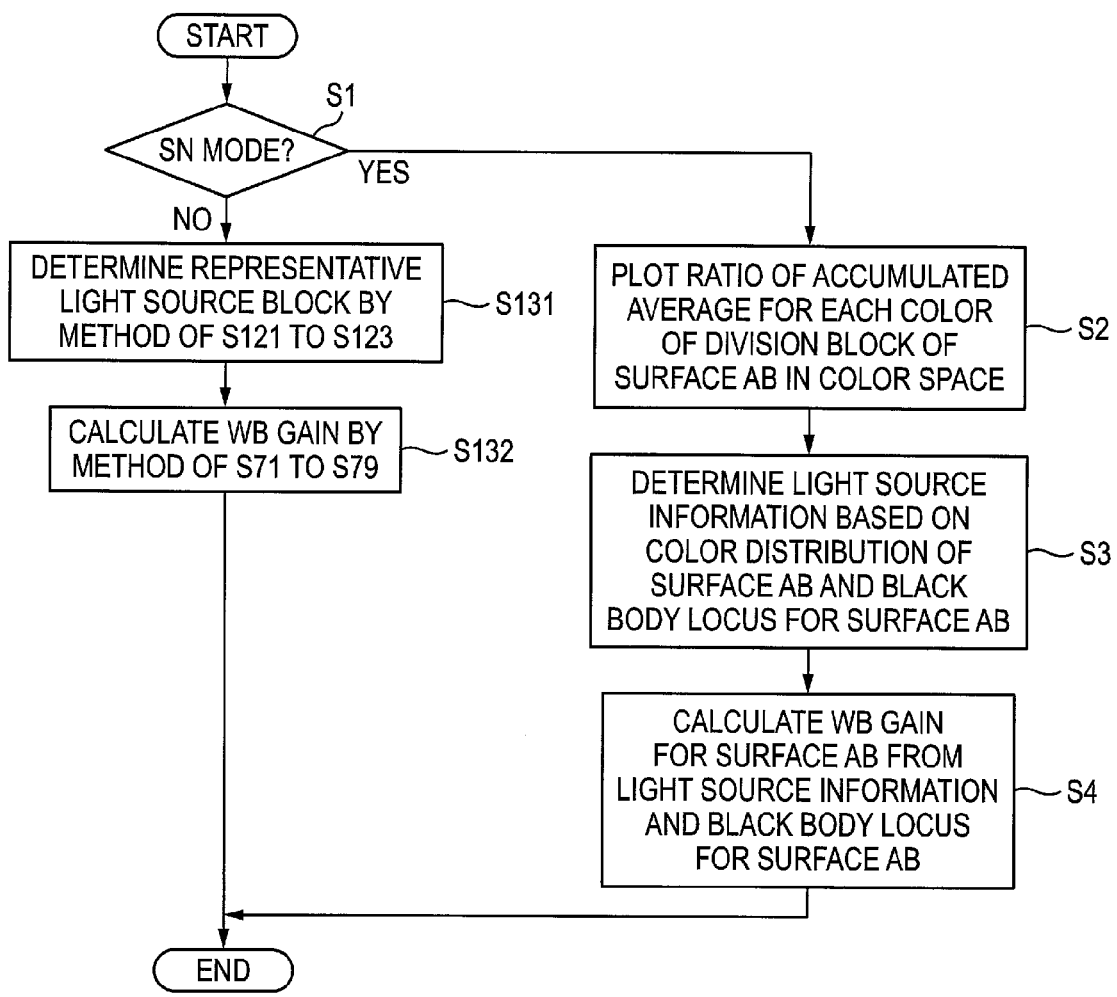
FIG. 13 is a flow chart for describing an operation of the digital camera that is a fourth modified embodiment of the digital camera illustrated in FIG. 1.

FIG. 13 is a flow chart for describing a WB gain calculation operation of a digital camera that is the fourth modified embodiment of the digital camera illustrated in FIG. 1. The flow chart illustrated in FIG. 13 is the same as the flow chart illustrated in FIG. 5 except that the processing to be performed after the determination result at step S1 is "NO" is different.

When the determination result at step S1 is "NO", the WB gain calculation unit 24 determines the light source information AP and BP by the method of steps S121 to S123 illustrated in FIG. 12 (step S131).

Next, the WB gain calculation unit 24 calculates the WB gain by the method of steps S71 to S79 illustrated in FIG. 7 (step S132).

As described above, in the digital camera illustrated in FIG. 1, the improvement in processing speed, the improvement in light source determination precision, and the improvement in white balance adjustment precision can be realized by combining the processing contents of the first modified embodiment and the third modified embodiment.

(Fifth Modified Embodiment)

Figure 14:
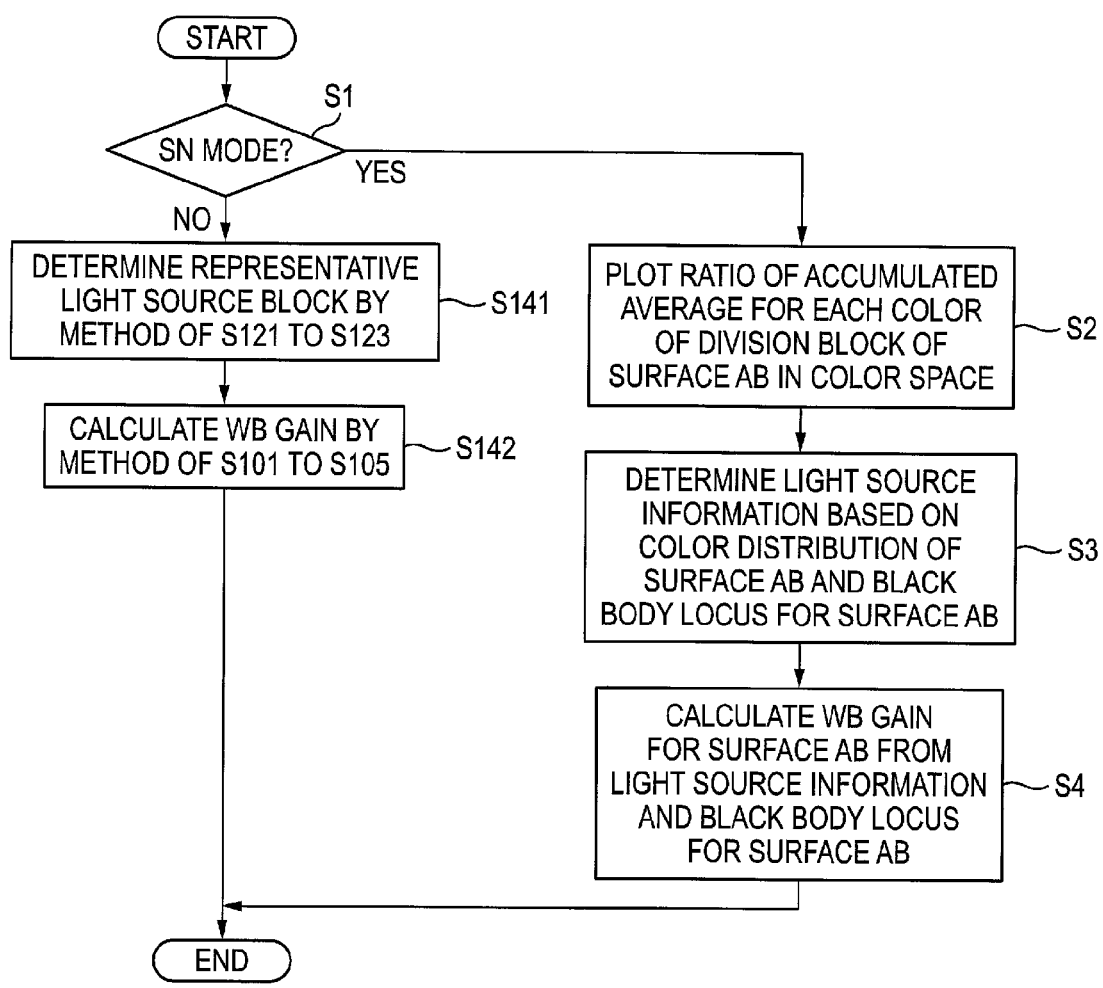
FIG. 14 is a flow chart for describing an operation of a digital camera that is a fifth modified embodiment of a digital camera illustrated in FIG. 1.

FIG. 14 is a flow chart for describing a WB calculation operation of a digital camera that is a fifth modified embodiment of a digital camera illustrated in FIG. 1. The flow chart illustrated in FIG. 14 is the same as the flow chart illustrated in FIG. 5 except that the processing to be performed after the determination result at step S1 is "NO" is different.

When the determination result at step S1 is "NO", the WB gain calculation unit 24 determines the light source information AP and BP by the method of steps S121 to S123 illustrated in FIG. 12 (step S141).

Next, the WB gain calculation unit 24 calculates the WB gain by the method of steps S101 to S105 illustrated in FIG. 10 and the method of steps S71 to S79 illustrated in FIG. 7 (step S142).

As such, in the digital camera illustrated in FIG. 1, the improvement in processing speed, the improvement in light source determination precision, and the improvement in white balance adjustment precision can be realized by combining the processing contents of the second modified embodiment and the third modified embodiment.

Meanwhile, even though the foregoing description describes that the photoelectric conversion elements 51W and the photoelectric conversion elements configuring a pair satisfy the conditions of (1) to (5), at least conditions (1) and (2) among the conditions (1) to (5) need to be satisfied in order to obtain the image quality having two different colors by the single solid state imaging device 5.

This is because when the condition (1) is not satisfied, the effect of improving color reproducibility is not obtained and when the condition (2) is not satisfied, the correlation of the signals obtained from the pair is reduced.

In addition, as the method of making the spectral sensitivity characteristics different in the photoelectric conversion elements 51W and the photoelectric conversion elements 51N configuring the pair, the following method may be adopted.

That is, the spectral sensitivity characteristics of the color filter R1 and the color filter R2 are made the same, the spectral sensitivity characteristics of the color filter G1 and the color filter G2 are made the same, and the spectral sensitivity characteristics of the color filter B1 and the color filter B2 are made the same. Further, the spectral sensitivity characteristics of the photoelectric conversion element 51W and the photoelectric conversion element 51N become different by making structures of the photoelectric conversion element 51W and the photoelectric conversion element 51N configuring the pair different. For example, there is a method of changing a depth of a pn junction surface of the photodiode configuring the photoelectric conversion element 51W and a depth of a pn junction surface of the photodiode configuring the photoelectric conversion element 51N between the photoelectric conversion elements 51W and 51N configuring the pair.

Figure 15:
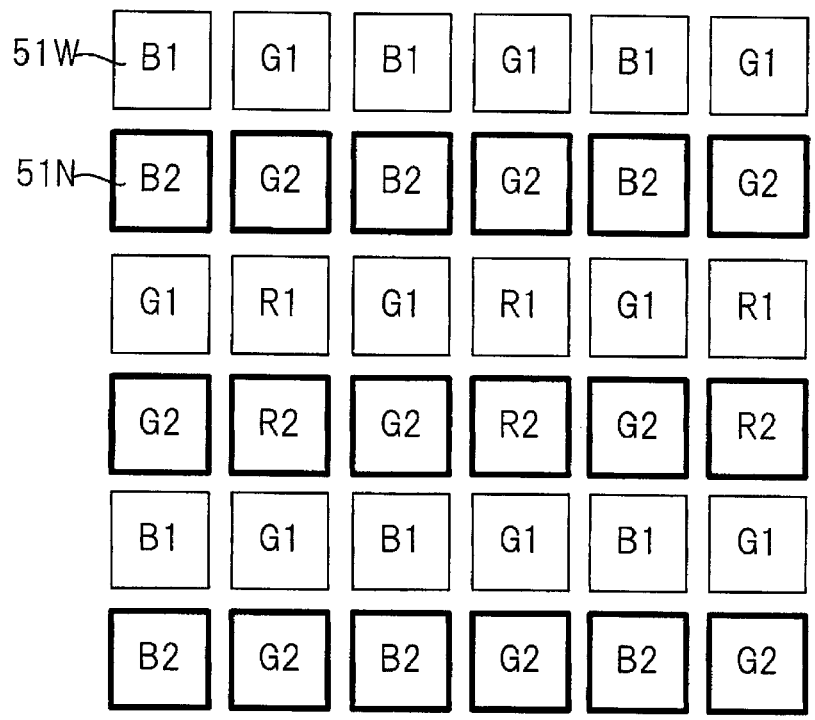
FIG. 15 is a diagram illustrating a modified embodiment of the solid state imaging device illustrated in FIG. 2.
Figure 16:
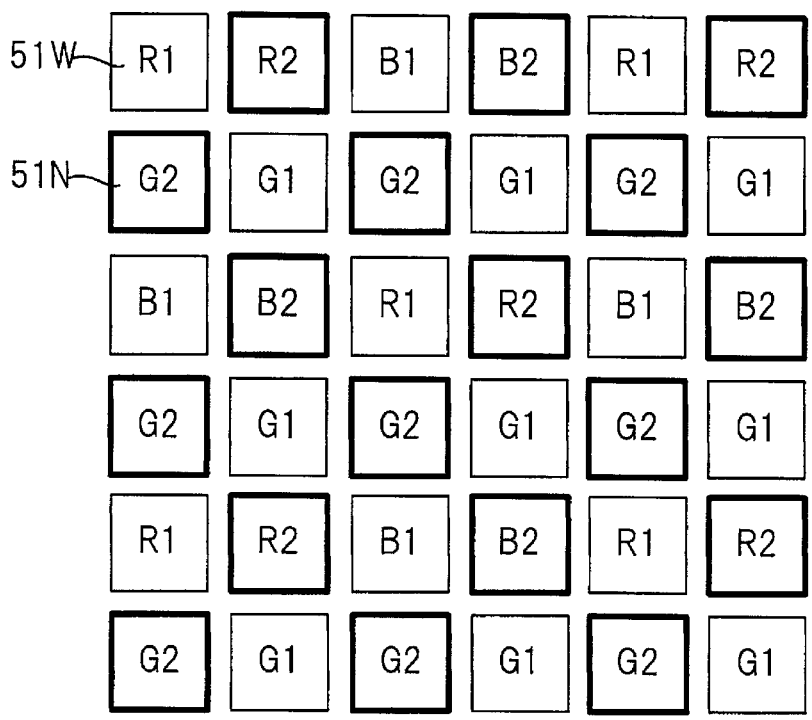
FIG. 16 is a diagram illustrating a modified embodiment of the solid state imaging device illustrated in FIG. 2.

Further, the array of the photoelectric conversion elements 51W and 51N of the solid state imaging device 5 may be one illustrated in FIGS. 15 and 16.

FIG. 15 is a diagram illustrating a modified embodiment of the solid state imaging device illustrated in FIG. 2. In the solid state imaging device according to the modified embodiment, the plurality of photoelectric conversion devices is arranged in a tetragonal lattice and among them, an odd-numbered row is set to be the photoelectric conversion elements 51W and an even-numbered row is set to be the photoelectric conversion elements 51N.

FIG. 16 is a diagram illustrating a modified embodiment of the solid state imaging device illustrated in FIG. 2. The solid state imaging device according to the modified embodiment has a configuration in which the plurality of photoelectric conversion elements is arranged in a tetragonal lattice and is configured such that among them, the photoelectric conversion elements 51W are disposed at positions forming one checkered pattern and the photoelectric conversion elements 51N are disposed at positions forming the other checkered pattern.

Even in the case of the array illustrated in FIG. 15, each photoelectric conversion element 51W and each photoelectric conversion element 51N adjacent (adjacent in the same direction) to each photoelectric conversion element 51W at the same position relationship are handled as a pair, thereby promoting the improvement in color reproducibility. In addition, even in the case of the array as illustrated in FIG. 16, in an odd-numbered column, each photoelectric conversion element 51W and each photoelectric conversion element 51N adjacent (adjacent in a right direction) to each photoelectric conversion element 51W at the same position relationship are handled as a pair and in an even-numbered column, each photoelectric conversion element 51W and each photoelectric conversion element 51N adjacent (adjacent in a left direction) to each photoelectric conversion element 51W at the same position relationship are handled as a pair, thereby promoting the improvement in color reproducibility.

Meanwhile, in the description hitherto, the solid state imaging device 5 has three kinds of pairs and three primary colors of R, G, and B are detected by the three kinds of pairs, but the present invention is not limited thereto. For example, a configuration of detecting complementary colors of cyan, magenta, and yellow by three kinds of pairs may be allowed. Further, the kind of pair is not limited to three kinds and if the kind of pair is at least two kinds, the color imaging may be performed.

Further, the solid state imaging device 5 is not be limited to a CCD type but may be an MOS type. In this case, as described in Japanese Patent Application Laid-Open Publication No. 2007-124137, a scan circuit and a CDS circuit may be separately disposed in the first group and the second group. Further, in this case, in the SN mode, the analog signal processing unit 6 may adopt a method of adding signals from a pair to each other to obtain signals (Surface AB) corresponding to each pair.

As described above, in the present specification, the following matters are disclosed.

The disclosed imaging apparatus includes a solid state imaging device that includes plural pairs of a first photoelectric conversion element and a second photoelectric conversion element each having different spectral sensitivity characteristics, in which a wavelength range in which the first photoelectric conversion element of each pair mainly has a spectral sensitivity and a wavelength range in which the second photoelectric conversion element of each pair mainly has a spectral sensitivity fall within a wavelength range of a specific color of a visible light, respectively, the plural pairs includes plural kinds of pairs of which the specific colors are different, and the imaging apparatus has a first mode in which an added signal obtained by adding signals obtained from the first photoelectric conversion element and the second photoelectric conversion element of the pair and corresponded to the pair is processed to generate an image data, and a second mode in which signals obtained from a plurality of first photoelectric conversion elements and a plurality of second photoelectric conversion elements are processed to generate an image data, the imaging apparatus comprises: a memory unit that stores black body locus data indicating a locus of a color change of a black body by a color temperature in a predetermined color space as black body locus data for a first signal obtained from a first group formed with the plurality of first photoelectric conversion elements and black body locus data for a second signal obtained from a second group formed with the plurality of second photoelectric conversion elements, respectively; a color information generating unit that divides the first signal into a plurality of blocks to generate first color information of each block from the first signal of the block, divides the second signal into the plurality of blocks to generate second color information of each block from the second signal of the block, and divides the added signal into the plurality of blocks to generate third color information of each block from the signal of the block; a black body locus data acquiring unit that acquires black body locus data for the added signal; a light source information determining unit that performs during the second mode a first processing of independently determining first light source information on the first signal at the time of imaging and second light source information on the second signal at the time of the imaging on the basis of a distribution of the first color information, the black body locus data for the first signal, a distribution of the second color information, and the black body locus data for the second signal, and performs during the first mode a second processing of determining third light source information on the added signal at the time of the imaging on the basis of a distribution of the third color information and the black body locus data for the added signal; and a white balance gain calculating unit that calculates white balance gains of the first signal and the second signal on the basis of the first light source information and the second light source information and calculates a white balance gain of the added signal on the basis of the third light source information.

The disclosed imaging apparatus, further comprises: a light source information changing unit that calculates a distance between the first light source information and the second light source information in the color space and when the calculated distance exceeds a first threshold value, compares a first distance between the first light source information and the black body locus data for the first signal in the color space with a second distance between the second light source information and the black body locus data for the second signal in the color space, and changes any one of the first light source information and the second light source information according to the comparison result.

In the disclosed imaging apparatus, the light source information changing unit changes the second light source information on the basis of the first light source information when the second distance is larger than the first distance and changes the first light source information on the basis of the second light source information when the first distance is larger than the second distance.

In the disclosed imaging apparatus, in the first processing, when there is the first color information carried in the black body locus data for the first signal, there is the second color information carried in the black body locus data for the second signal, and the first color information and the second color information are color information generated from the same block, the light source information determining unit determines that the first color information carried in the black body locus data for the first signal and the second color information carried in the black body locus data for the second signal are light source information at the time of the imaging.

In the disclosed imaging apparatus, a half width in the spectral sensitivity characteristics of the first photoelectric conversion element of each pair is wider than a half width in the spectral sensitivity characteristics of the second photoelectric conversion element of the pair, and the spectral sensitivity of the first photoelectric conversion element of each pair in respective wavelengths in the wavelength range in which the first photoelectric conversion element of the pair mainly has the spectral sensitivity is higher than the spectral sensitivity in corresponding wavelengths of the second photoelectric conversion element of the pair.

In the disclosed imaging apparatus, when the first light source information and the second light source information are in a specific area, the white balance gain calculating unit compares a third distance between the first light source information and the black body locus data for the first signal in the color space with a fourth distance between the second light source information and the black body locus data for the second signal in the color space, and changes a white balance gain calculating process of calculating the white balance gains of the first signal and the second signal according to the comparison result.

In the disclosed imaging apparatus, when a value obtained by subtracting the third distance from the fourth distance is a second threshold value or less, the white balance gain calculating unit calculates the white balance gain having a smaller gain than that in a case of the obtained value with the value exceeding the second threshold value.

In the disclosed imaging apparatus, the plural kinds of pairs include three kinds of a pair of which one of the specific colors is a first color, a pair of which another of the specific colors is a second color, and a pair of which the other of the specific colors is a third color, and in the color space in which (the third color)/(the second color) is represented in a vertical axis and (the first color)/(the second color) is represented in a horizontal axis, a curve of the black body locus data for the first signal is disposed at a position more distant from the vertical axis as compared with a curve of the black body locus data for the second signal in an area in which a value of (the first color)/(the second color) becomes smaller as compared with a reference point at which the black body locus data for the first signal and the black body locus data for the second signal intersect with each other, and the curve of the black body locus data for the first signal is disposed at a position closer to the horizontal axis as compared with the curve of the black body locus data for the second signal in an area in which the value of (the first color)/(the second color) becomes larger as compared with the reference point.

In the disclosed imaging apparatus, the memory unit stores the black body locus data for the added signal, and the black body locus data acquiring unit acquires the black body locus data for the added signal from the memory unit.

In the disclosed imaging apparatus, the black body locus data acquiring unit acquires the black body locus data by generating the black body locus data for the added signal from the black body locus data for the first signal and the black body locus data for the second signal.

In the disclosed imaging apparatus, the solid state imaging device includes color filters installed above the first photoelectric conversion elements and installed above the second photoelectric conversion elements, and a difference in spectral sensitivity characteristics between the first photoelectric conversion element of each pair and the second photoelectric conversion element of the pair is obtained by a difference in spectral sensitivity characteristics between a color filter disposed above the first photoelectric conversion element and a color filter disposed above the second photoelectric conversion element.

In the disclosed imaging apparatus, the first photoelectric conversion elements and the second photoelectric conversion elements are disposed in an arrangement in which first photoelectric conversion element columns in which the first photoelectric conversion elements are arranged in a column direction and second photoelectric conversion element columns in which the second photoelectric conversion elements are arranged the column direction are alternately arranged in a row direction intersecting with the column direction, each second photoelectric conversion element column is disposed to be offset in the column direction by ½ of an arrangement pitch in the column direction of each of the first photoelectric conversion elements and the second photoelectric conversion elements, with respect to the corresponding first photoelectric conversion element column, and each of the first photoelectric conversion elements and the corresponding one of the second photoelectric conversion elements adjacent thereto in the same position relationship configure each pair.

The disclosed method of calculating a white balance gain in an imaging apparatus including a solid state imaging device including plural pairs of a first photoelectric conversion element and a second photoelectric conversion element each having different spectral sensitivity characteristics, in which a wavelength range in which the first photoelectric conversion element of each pair mainly has a spectral sensitivity and a wavelength range in which the second photoelectric conversion element of each pair mainly has a spectral sensitivity fall within a wavelength range of a specific color of a visible light, respectively, the plural pairs includes plural kinds of pairs of which the specific colors are different, and the imaging apparatus has a first mode in which an added signal obtained by adding signals obtained from the first photoelectric conversion element and the second photoelectric conversion element of the pair and corresponded to the pair is processed to generate an image data and a second mode in which signals obtained from the plurality of first photoelectric conversion elements and the plurality of second photoelectric conversion elements are processed to generate an image data, and the imaging apparatus includes a memory unit that stores black body locus data indicating a locus of a color change of a black body by a color temperature in a predetermined color space as black body locus data for a first signal obtained from a first group formed with the plurality of first photoelectric conversion elements and black body locus data for a second signal obtained from a second group formed with the plurality of second photoelectric conversion elements, respectively, and the method comprises: a color information generating step of dividing the first signal into a plurality of blocks to generate first color information of each block from the first signal of the block, dividing the second signal into the plurality of blocks to generate second color information of each block from the second signal of the block, and dividing the added signal into the plurality of blocks to generate third color information of each block from the signal of the block; a black body locus data acquiring step of acquiring black body locus data for the added signal; a light source information determining step of performing during the second mode a first processing of independently determining first light source information on the first signal at the time of imaging and second light source information on the second signal at the time of the imaging on the basis of a distribution of the first color information, the black body locus data for the first signal, a distribution of the second color information, and the black body locus data for the second signal, and performing during the first mode a second processing of determining third light source information on the added signal at the time of the imaging on the basis of a distribution of the third color information and the black body locus data for the added signal; and a white balance gain calculating step of calculating white balance gains of the first signal and the second signal based on the first light source information and the second light source information and calculating a white balance gain of the added signal based on the third light source information.

The disclosed method, further comprises: a light source information changing step of calculating a distance between the first light source information and the second light source information in the color space and when the calculated distance exceeds a first threshold value, comparing a first distance between the first light source information and the black body locus data for the first signal in the color space with a second distance between the second light source information and the black body locus data for the second signal in the color space, and changing any one of the first light source information and the second light source information according to the comparison result.

In the disclosed method, in the light source information changing step, the second light source information is changed on the basis of the first light source information when the second distance is larger than the first distance, and the first light source information is changed on the basis of the second light source information when the first distance is larger than the second distance.

In the disclosed method, in the light source information determining step, when there is the first color information carried in the black body locus data for the first signal, there is the second color information carried in the black body locus data for the second signal, and the first color information and the second color information are color information generated from the same block, the first color information carried in the black body locus data for the first signal and the second color information carried in the black body locus data for the second signal are determined as light source information at a time of the imaging, in the first processing.

In the disclosed method, a half width in the spectral sensitivity characteristics of the first photoelectric conversion element of each pair is wider than a half width in the spectral sensitivity characteristics of the second photoelectric conversion element of the pair, and the spectral sensitivity of the first photoelectric conversion element of each pair in respective wavelengths in the wavelength range in which the first photoelectric conversion elements mainly of the pair has the spectral sensitivity is higher than the spectral sensitivity in corresponding wavelengths of the second photoelectric conversion element of the pair.

In the disclosed method, when the first light source information and the second light source information are in a specific area, a third distance between the first light source information and the black body locus data for the first signal in the color space is compared with a fourth distance between the second light source information and the black body locus data for the second signal in the color space, and a white balance gain calculating process of calculating the white balance gains of the first signal and the second signal is changed according to the comparison result, in the white balance gain calculating step.

In the disclosed method, in the white balance gain calculating step, a value obtained by subtracting the third distance from the fourth distance is a second threshold value or less, it is calculated the obtained value having a smaller gain than that in a case of the obtained value with the value exceeding the second threshold value.

In the disclosed method, in which the plural kinds of pairs include three kinds of a pair of which one of the specific colors is a first color, a pair of which another of the specific colors is a second color, and a pair of which the other of the specific colors is a third color, and in the color space in which (the third color)/(the second color) is represented in a vertical axis and (the first color)/(the second color) is represented in a horizontal axis, a curve of the black body locus data for the first signal is disposed at a position more distant from the vertical axis as compared with a curve of the black body locus data for the second signal in an area in which a value of (the first color)/(the second color) becomes smaller as compared with a reference point at which the black body locus data for the first signal and the black body locus data for the second signal intersect with each other, and the curve of the black body locus data for the first signal is disposed at a position closer to the horizontal axis as compared with the curve of the black body locus data for the second signal in an area in which the value of (the first color)/(the second color) becomes larger as compared with the reference point.

In the disclosed method, the memory unit stores the black body locus data for the added signal, and in the black body locus data acquiring step, the black body locus data for the added signal are acquired from the memory unit.

In the disclosed method, in the black body locus data acquiring step, the black body locus data are acquired by generating the black body locus data for the added signal from the black body locus data for the first signal and the black body locus data for the second signal.

In the disclosed method, the solid state imaging device includes color filters installed above the first photoelectric conversion elements and installed above the second photoelectric conversion elements, and a difference in spectral sensitivity characteristics between the first photoelectric conversion element of each pair and the second photoelectric conversion element of the pair is obtained by a difference in spectral sensitivity characteristics between a color filter disposed above the first photoelectric conversion element and a color filter disposed the second photoelectric conversion element.

In the disclosed method, the first photoelectric conversion elements and the second photoelectric conversion elements are disposed in an arrangement in which first photoelectric conversion element columns in which the first photoelectric conversion elements are arranged in a column direction and second photoelectric conversion element columns in which the second photoelectric conversion elements are arranged in the column direction are alternately arranged in a row direction intersecting with the column direction, each second photoelectric conversion element column is disposed to be offset in the column direction by ½ of an arrangement pitch in the column direction of each of the first photoelectric conversion elements and the second photoelectric conversion elements, with respect to the corresponding first photoelectric conversion element column, and each of the first photoelectric conversion elements and the corresponding one of the second photoelectric conversion elements adjacent thereto in the same position relationship configure each pair.

INDUSTRIAL APPLICABILITY

According to the present invention, it is possible to provide an imaging apparatus and a method of calculating a white balance gain capable of appropriately adjusting the white balance while improving the color reproducibility.

Although the present invention is described with reference to the detailed and specific embodiments, it is apparent to those skilled in the art that various changes or modifications may be practiced without departing from the spirit and scope of the present invention.

The present application is based on Japanese Patent Application (Patent Application No. 2010-123585) filed on May 28, 2010, the disclosure of which is incorporated herein by reference in its entirety.

REFERENCE SIGNS LIST

5: Solid state imaging device
10: Imaging device driving unit
51W, 51N: Photoelectric conversion element

The invention claimed is:

1. An imaging apparatus including a solid state imaging device that includes plural pairs of a first photoelectric conversion element and a second photoelectric conversion element each having different spectral sensitivity characteristics,
    wherein a wavelength range in which the first photoelectric conversion element of each pair mainly has a spectral sensitivity and a wavelength range in which the second photoelectric conversion element of each pair mainly has a spectral sensitivity fall within a wavelength range of a specific color of a visible light, respectively,
    the plural pairs includes plural kinds of pairs of which the specific colors are different, and
    the imaging apparatus has a first mode in which an added signal obtained by adding signals obtained from the first photoelectric conversion element and the second photoelectric conversion element of the pair and corresponded to the pair is processed to generate an image data, and a second mode in which signals obtained from a plurality of first photoelectric conversion elements and a plurality of second photoelectric conversion elements are processed to generate an image data, the imaging apparatus comprising:

a memory unit that stores black body locus data indicating a locus of a color change of a black body by a color temperature in a predetermined color space as black body locus data for a first signal obtained from a first group formed with the plurality of first photoelectric conversion elements and black body locus data for a second signal obtained from a second group formed with the plurality of second photoelectric conversion elements, respectively;

a color information generating unit that divides the first signal into a plurality of blocks to generate first color information of each block from the first signal of the block, divides the second signal into the plurality of blocks to generate second color information of each block from the second signal of the block, and divides the added signal into the plurality of blocks to generate third color information of each block from the signal of the block;

a black body locus data acquiring unit that acquires black body locus data for the added signal;

a light source information determining unit that performs during the second mode a first processing of independently determining first light source information on the first signal at the time of imaging and second light source information on the second signal at the time of the imaging on the basis of a distribution of the first color information, the black body locus data for the first signal, a distribution of the second color information, and the black body locus data for the second signal, and performs during the first mode a second processing of determining third light source information on the added signal at the time of the imaging on the basis of a distribution of the third color information and the black body locus data for the added signal; and a white balance gain calculating unit that calculates white balance gains of the first signal and the second signal on the basis of the first light source information and the second light source information and calculates a white balance gain of the added signal on the basis of the third light source information.

2. The imaging apparatus according to claim 1, further comprising:

a light source information changing unit that calculates a distance between the first light source information and the second light source information in the color space and when the calculated distance exceeds a first threshold value, compares a first distance between the first light source information and the black body locus data for the first signal in the color space with a second distance between the second light source information and the black body locus data for the second signal in the color space, and changes any one of the first light source information and the second light source information according to the comparison result.

3. The imaging apparatus according to claim 2, wherein the light source information changing unit changes the second light source information on the basis of the first light source information when the second distance is larger than the first distance and changes the first light source information on the basis of the second light source information when the first distance is larger than the second distance.

4. The imaging apparatus according to claim 1, wherein in the first processing, when there is the first color information carried in the black body locus data for the first signal, there is the second color information carried in the black body locus data for the second signal, and the first color information and the second color information are color information generated from the same block, the light source information determining unit determines that the first color information carried in the black body locus data for the first signal and the second color information carried in the black body locus data for the second signal are light source information at the time of the imaging.

5. The imaging apparatus according to claim 1, wherein a half width in the spectral sensitivity characteristics of the first photoelectric conversion element of each pair is wider than a half width in the spectral sensitivity characteristics of the second photoelectric conversion element of the pair, and the spectral sensitivity of the first photoelectric conversion element of each pair in respective wavelengths in the wavelength range in which the first photoelectric conversion element of the pair mainly has the spectral sensitivity is higher than the spectral sensitivity in corresponding wavelengths of the second photoelectric conversion element of the pair.

6. The imaging apparatus according to claim 5, wherein when the first light source information and the second light source information are in a specific area, the white balance gain calculating unit compares a third distance between the first light source information and the black body locus data for the first signal in the color space with a fourth distance between the second light source information and the black body locus data for the second signal in the color space, and changes a white balance gain calculating process of calculating the white balance gains of the first signal and the second signal according to the comparison result.

7. The imaging apparatus according to claim 6, wherein when a value obtained by subtracting the third distance from the fourth distance is a second threshold value or less, the white balance gain calculating unit calculates the white balance gain having a smaller gain than that in a case of the obtained value with the value exceeding the second threshold value.

8. The imaging apparatus according to claim 5, wherein the plural kinds of pairs include three kinds of a pair of which one of the specific colors is a first color, a pair of which another of the specific colors is a second color, and a pair of which the other of the specific colors is a third color, and in the color space in which (the third color)/(the second color) is represented in a vertical axis and (the first color)/(the second color) is represented in a horizontal axis, a curve of the black body locus data for the first signal is disposed at a position more distant from the vertical axis as compared with a curve of the black body locus data for the second signal in an area in which a value of (the first color)/(the second color) becomes smaller as compared with a reference point at which the black body locus data for the first signal and the black body locus data for the second signal intersect with each other, and the curve of the black body locus data for the first signal is disposed at a position closer to the horizontal axis as compared with the curve of the black body locus data for the second signal in an area in which the value of (the first color)/(the second color) becomes larger as compared with the reference point.

9. The imaging apparatus according to claim 1, wherein the memory unit stores the black body locus data for the added signal, and the black body locus data acquiring unit acquires the black body locus data for the added signal from the memory unit.

10. The imaging apparatus according to claim 1, wherein the black body locus data acquiring unit acquires the black body locus data by generating the black body locus data for the added signal from the black body locus data for the first signal and the black body locus data for the second signal.

11. The imaging apparatus according to claim 1, wherein the solid state imaging device includes color filters installed above the first photoelectric conversion elements and installed above the second photoelectric conversion elements, and
a difference in spectral sensitivity characteristics between the first photoelectric conversion element of each pair and the second photoelectric conversion element of the pair is obtained by a difference in spectral sensitivity characteristics between a color filter disposed above the first photoelectric conversion element and a color filter disposed above the second photoelectric conversion element.

12. The imaging apparatus according to claim 1, wherein the first photoelectric conversion elements and the second photoelectric conversion elements are disposed in an arrangement in which first photoelectric conversion element columns in which the first photoelectric conversion elements are arranged in a column direction and second photoelectric conversion element columns in which the second photoelectric conversion elements are arranged the column direction are alternately arranged in a row direction intersecting with the column direction,
each second photoelectric conversion element column is disposed to be offset in the column direction by ½ of an arrangement pitch in the column direction of each of the first photoelectric conversion elements and the second photoelectric conversion elements, with respect to the corresponding first photoelectric conversion element column, and
each of the first photoelectric conversion elements and the corresponding one of the second photoelectric conversion elements adjacent thereto in the same position relationship configure each pair.

13. A method of calculating a white balance gain in an imaging apparatus including a solid state imaging device including plural pairs of a first photoelectric conversion element and a second photoelectric conversion element each having different spectral sensitivity characteristics,
wherein a wavelength range in which the first photoelectric conversion element of each pair mainly has a spectral sensitivity and a wavelength range in which the second photoelectric conversion element of each pair mainly has a spectral sensitivity fall within a wavelength range of a specific color of a visible light, respectively,
the plural pairs includes plural kinds of pairs of which the specific colors are different, and
the imaging apparatus has a first mode in which an added signal obtained by adding signals obtained from the first photoelectric conversion element and the second photoelectric conversion element of the pair and corresponded to the pair is processed to generate an image data and a second mode in which signals obtained from the plurality of first photoelectric conversion elements and the plurality of second photoelectric conversion elements are processed to generate an image data, and the imaging apparatus includes a memory unit that stores black body locus data indicating a locus of a color change of a black body by a color temperature in a predetermined color space as black body locus data for a first signal obtained from a first group formed with the plurality of first photoelectric conversion elements and black body locus data for a second signal obtained from a second group formed with the plurality of second photoelectric conversion elements, respectively,
the method comprising:
a color information generating step of dividing the first signal into a plurality of blocks to generate first color information of each block from the first signal of the block, dividing the second signal into the plurality of blocks to generate second color information of each block from the second signal of the block, and dividing the added signal into the plurality of blocks to generate third color information of each block from the signal of the block;
a black body locus data acquiring step of acquiring black body locus data for the added signal;
a light source information determining step of performing during the second mode a first processing of independently determining first light source information on the first signal at the time of imaging and second light source information on the second signal at the time of the imaging on the basis of a distribution of the first color information, the black body locus data for the first signal, a distribution of the second color information, and the black body locus data for the second signal, and performing during the first mode a second processing of determining third light source information on the added signal at the time of the imaging on the basis of a distribution of the third color information and the black body locus data for the added signal; and
a white balance gain calculating step of calculating white balance gains of the first signal and the second signal based on the first light source information and the second light source information and calculating a white balance gain of the added signal based on the third light source information.

14. The method according to claim 13, further comprising:
a light source information changing step of calculating a distance between the first light source information and the second light source information in the color space and when the calculated distance exceeds a first threshold value, comparing a first distance between the first light source information and the black body locus data for the first signal in the color space with a second distance between the second light source information and the black body locus data for the second signal in the color space, and changing any one of the first light source information and the second light source information according to the comparison result.

15. The method according to claim 14, wherein in the light source information changing step, the second light source information is changed on the basis of the first light source information when the second distance is larger than the first distance, and the first light source information is changed on the basis of the second light source information when the first distance is larger than the second distance.

16. The method according to claim 13, wherein in the light source information determining step, when there is the first color information carried in the black body locus data for the first signal, there is the second color information carried in the black body locus data for the second signal, and the first color information and the second color information are color information generated from the same block, the first color information carried in the black body locus data for the first signal and the second color information carried in the black body locus data for the second signal are determined as light source information at the time of the imaging, in the first processing.

17. The method according to claim 13, wherein a half width in the spectral sensitivity characteristics of the first photoelectric conversion element of each pair is wider than a half width in the spectral sensitivity characteristics of the second photoelectric conversion element of the pair, and the spectral sensitivity of the first photoelectric conversion element of each pair in respective wavelengths in the wavelength range in which the first photoelectric conversion elements mainly of the pair has the spectral sensitivity is higher than the spectral sensitivity in corresponding wavelengths of the second photoelectric conversion element of the pair.

18. The method according to claim 17, wherein when the first light source information and the second light source information are in a specific area, a third distance between the first light source information and the black body locus data for the first signal in the color space is compared with a fourth distance between the second light source information and the black body locus data for the second signal in the color space, and a white balance gain calculating process of calculating the white balance gains of the first signal and the second signal is changed according to the comparison result, in the white balance gain calculating step.

19. The method according to claim 18, wherein in the white balance gain calculating step, a value obtained by subtracting the third distance from the fourth distance is a second threshold value or less, it is calculated the obtained value having a smaller gain than that in a case of the obtained value with the value exceeding the second threshold value.

20. The method according to claim 17, wherein the plural kinds of pairs include three kinds of a pair of which one of the specific colors is a first color, a pair of which another of the specific colors is a second color, and a pair of which the other of the specific colors is a third color, and in the color space in which (the third color)/(the second color) is represented in a vertical axis and (the first color)/(the second color) is represented in a horizontal axis, a curve of the black body locus data for the first signal is disposed at a position more distant from the vertical axis as compared with a curve of the black body locus data for the second signal in an area in which a value of (the first color)/(the second color) becomes smaller as compared with a reference point at which the black body locus data for the first signal and the black body locus data for the second signal intersect with each other, and the curve of the black body locus data for the first signal is disposed at a position closer to the horizontal axis as compared with the curve of the black body locus data for the second signal in an area in which the value of (the first color)/(the second color) becomes larger as compared with the reference point.

21. The method according to claim 13, wherein the memory unit stores the black body locus data for the added signal, and in the black body locus data acquiring step, the black body locus data for the added signal are acquired from the memory unit.

22. The method according to claim 13, wherein in the black body locus data acquiring step, the black body locus data are acquired by generating the black body locus data for the added signal from the black body locus data for the first signal and the black body locus data for the second signal.

23. The method according to claim 13, wherein the solid state imaging device includes color filters installed above the first photoelectric conversion elements and installed above the second photoelectric conversion elements, and a difference in spectral sensitivity characteristics between the first photoelectric conversion element of each pair and the second photoelectric conversion element of the pair is obtained by a difference in spectral sensitivity characteristics between a color filter disposed above the first photoelectric conversion element and a color filter disposed the second photoelectric conversion element.

24. The method according to claim 13, wherein the first photoelectric conversion elements and the second photoelectric conversion elements are disposed in an arrangement in which first photoelectric conversion element columns in which the first photoelectric conversion elements are arranged in a column direction and second photoelectric conversion element columns in which the second photoelectric conversion elements are arranged in the column direction are alternately arranged in a row direction intersecting with the column direction, each second photoelectric conversion element column is disposed to be offset in the column direction by ½ of an arrangement pitch in the column direction of each of the first photoelectric conversion elements and the second photoelectric conversion elements, with respect to the corresponding first photoelectric conversion element column, and each of the first photoelectric conversion elements and the corresponding one of the second photoelectric conversion elements adjacent thereto in the same position relationship configure each pair.

* * * * *